US011448530B2

(12) United States Patent
Takahashi et al.

(10) Patent No.: US 11,448,530 B2
(45) Date of Patent: Sep. 20, 2022

(54) ENCODER, SERVO MOTOR INCLUDING THE ENCODER, AND SERVO SYSTEM INCLUDING THE ENCODER

(71) Applicant: KABUSHIKI KAISHA YASKAWA DENKI, Kitakyushu (JP)

(72) Inventors: Masanao Takahashi, Kitakyushu (JP); Daisuke Furukawa, Kitakyushu (JP); Hiroshi Takada, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 400 days.

(21) Appl. No.: 16/783,167

(22) Filed: Feb. 6, 2020

(65) Prior Publication Data
US 2020/0278222 A1 Sep. 3, 2020

(30) Foreign Application Priority Data

Mar. 1, 2019 (JP) .............................. JP2019-037728

(51) Int. Cl.
*G01D 5/347* (2006.01)
(52) U.S. Cl.
CPC ................................ *G01D 5/34776* (2013.01)
(58) Field of Classification Search
CPC ............ G01D 5/34707; G01D 5/3473; G01D 5/34776; G01D 5/36
See application file for complete search history.

(56) References Cited

U.S. PATENT DOCUMENTS

| 2014/0183346 A1 | 7/2014 | Kato |
| 2015/0292918 A1 | 10/2015 | Yoshida et al. |
| 2015/0354992 A1 | 12/2015 | Murokita et al. |
| 2021/0018890 A1* | 1/2021 | Takada ................. G05B 19/358 |

FOREIGN PATENT DOCUMENTS

| CN | 104977032 | 10/2015 |
| JP | 02-35314 | 2/1990 |
| JP | 2001-124591 | 5/2001 |
| JP | 2014-126492 | 7/2014 |
| JP | 2015-232448 | 12/2015 |

OTHER PUBLICATIONS

Chinese Office Action for corresponding CN Application No. 201910450627.X, dated Aug. 25, 2021.
Japanese Office Action for corresponding JP Application No. 2019-037728, dated Jun. 28, 2019 (w/ English machine translation).
Japanese Office Action for corresponding JP Application No. 2019-037728, dated Aug. 14, 2019 (w/ English machine translation).

* cited by examiner

*Primary Examiner* — Kevin K Pyo
(74) *Attorney, Agent, or Firm* — Mori & Ward, LLP

(57) ABSTRACT

An encoder includes a measurement target and circuitry. The measurement target includes an absolute pattern and is rotatable. The circuitry is configured to generate, via a processing scheme, a signal representing an absolute position of the measurement target based on the absolute pattern. The circuitry is configured to detect, based on the absolute pattern, whether the measurement target rotates or not. The circuitry is configured to change the processing scheme based on whether the measurement target rotates or not.

12 Claims, 19 Drawing Sheets

FIG. 10  FIRST PROCESSING SCHEME (FORWARD ROTATION STATE)

ENCODER, SERVO MOTOR INCLUDING THE ENCODER, AND SERVO SYSTEM INCLUDING THE ENCODER

CROSS-REFERENCE TO RELATED APPLICATIONS

The present application claims priority under 35 U.S.C. § 119 to Japanese Patent Application No. 2019-37728, filed Mar. 1, 2019. The contents of this application are incorporated herein by reference in their entirety.

BACKGROUND OF THE INVENTION

Field of the Invention

The present invention relates to an encoder, a servo motor including the encoder, and a servo system including the encoder.

Discussion of the Background

Japanese Patent Application Publication No. H2-35314 describes an absolute value encoder configured to detect a recurring random number code written on a code plate as a two-phase code with a phase difference, switch this code with a reference pulse to input the code to a ROM, and, taking into account a conversion delay time of the ROM etc., trigger an output stage flip-flop.

In the absolute value encoder described in the Japanese Patent Application Publication No. H2-35314, there is a case where an absolute position cannot be detected with high accuracy while the code plate is rotating, and further improvement in detection accuracy has been demanded.

SUMMARY OF THE INVENTION

According to one aspect of the present invention, an encoder includes a measurement target and circuitry. The measurement target includes an absolute pattern and is rotatable. The circuitry is configured to generate, via a processing scheme, a signal representing an absolute position of the measurement target based on the absolute pattern. The circuitry is configured to detect, based on the absolute pattern, whether the measurement target rotates or not. The circuitry is configured to change the processing scheme based on whether the measurement target rotates or not.

DESCRIPTION OF EMBODIMENTS

Hereinafter, an embodiment will be described with reference to the drawings. An encoder according to the embodiment described below can be applied to various types of encoders such as rotary (rotary type) encoders and linear (linear type) encoders. In the embodiment described below, a rotary type encoder is taken as an example to facilitate understanding of the encoder. Other types of applications of encoders are viable by making appropriate changes such as changing a measurement target from a rotary type disk to a linear type linear scale, which will not be elaborated.

1. Servo System

Figure 1:
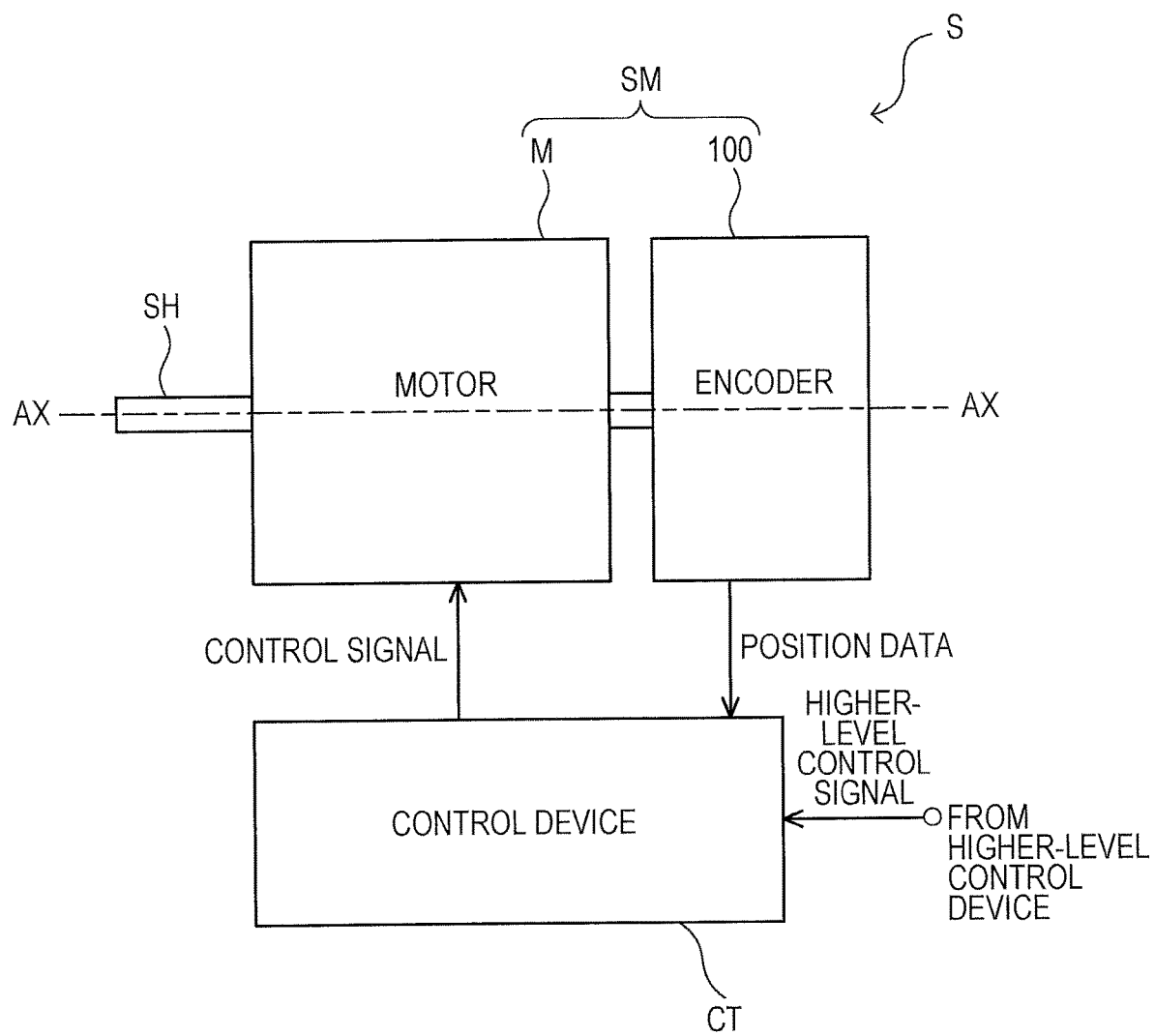
FIG. 1 is an explanatory diagram showing an example of a configuration of a servo system according to the present embodiment.

First, by referring to FIG. 1, a configuration of a servo system according to the present embodiment will be described. As shown in FIG. 1, a servo system S includes a servo motor SM and a control device (control circuitry) CT. The servo motor SM includes an encoder 100 and a motor M.

The motor M is a rotary type motor in which a rotor (not shown) rotates with respect to a stator (not shown). The motor M rotates a shaft SH, fixed to the rotor, around an axis AX to output rotational power.

Although the motor M alone is occasionally referred to as a servo motor, in this embodiment the configuration including the encoder 100 is referred to as the servo motor SM. In the following, for convenience of explanation, a description will be given of a case where the servo motor is controlled so as to follow target values of position, speed and the like. However, the follow-up control is not necessarily required, and for example, when an output of the encoder is used only for display, as long as the encoder is attached, a motor used for other than the servo system is included.

The encoder 100 is coupled to a side opposite to a rotational force output side of the shaft SH of the motor M. However, the encoder 100 is not necessarily connected to the opposite side of the rotational force output side of the shaft SH, and may be connected to the rotational force output side. The encoder 100 detects the position of the shaft SH (rotor) to detect the position of the motor M (also referred to as a rotation angle) and thus to output position data representing the position.

The encoder 100 may detect at least one of the speed of the motor M (also referred to as rotational speed or angular velocity) and the acceleration of the motor M (also referred to as rotational acceleration or angular acceleration) in addition to or instead of the position of the motor M. In this case, the speed and acceleration of the motor M can be detected by applying first-order or second-order differentiation to the position with time or by performing processing such as counting detection signals (for example, an incremental signal described later) for a predetermined time, for example. For the sake of convenience of the description, the description is made with respect to the case where a physical quantity detected by the encoder 100 is the position.

The control device CT acquires position data output from the encoder 100, and outputs a control signal (such as current or voltage) to the motor M based on the position data to control the rotation of the motor M. Further, the control device CT may be structured to acquire a higher-level control signal from a higher-level control device (not shown), and to control the motor M such that a rotational force which enables the position indicated by the higher-level control signal or the like is outputted from the shaft SH of the motor M.

2. Encoder

Figure 2:
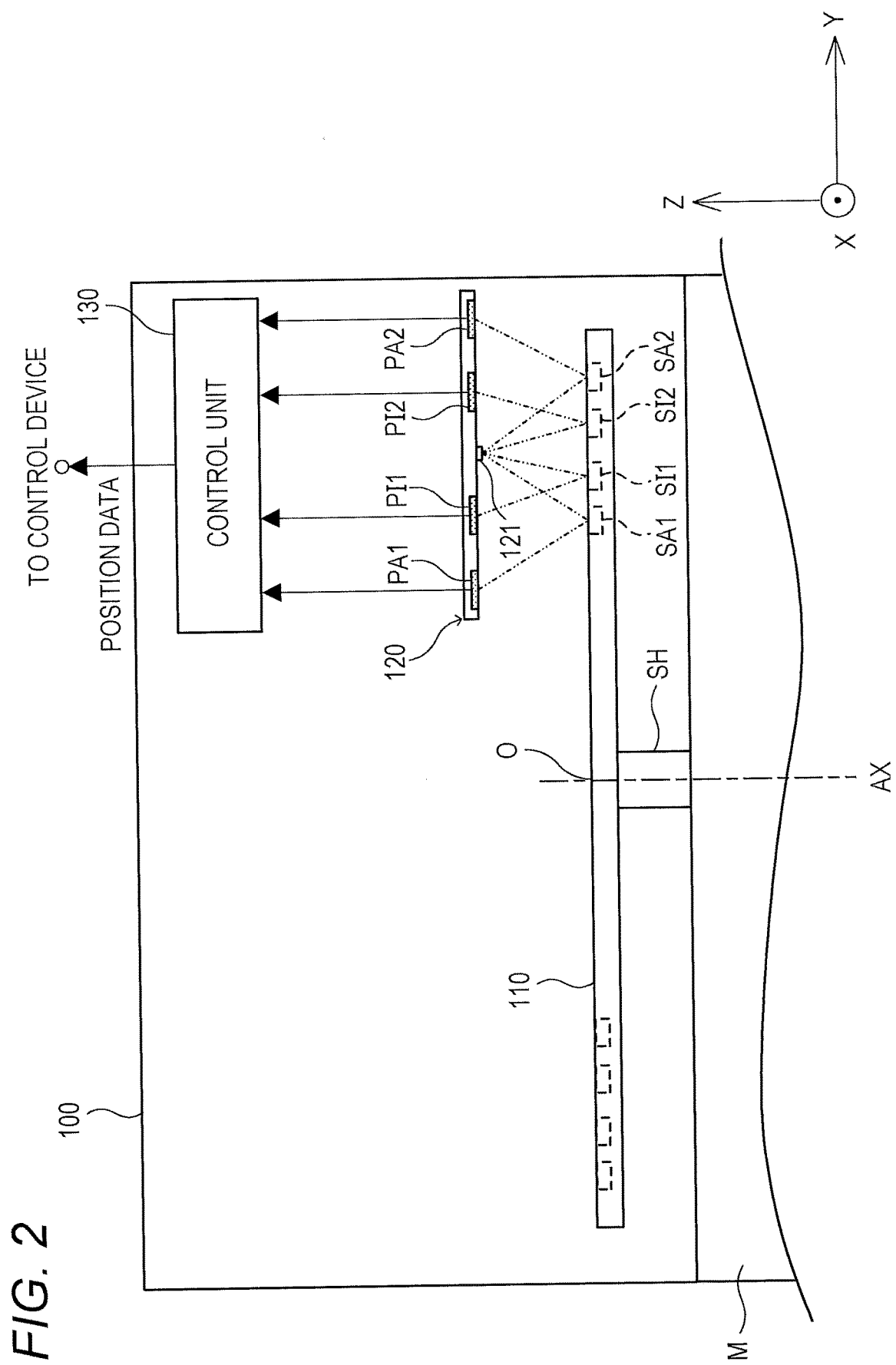
FIG. 2 is an explanatory diagram showing an example of a configuration of an encoder according to the present embodiment.

Next, the encoder 100 according to this embodiment will be described. As shown in FIG. 2, the encoder 100 includes a disk 110, an optical module 120, and a control unit (circuitry) 130.

Here, for convenience of description of the structure of the encoder 100, directions such as a vertical direction are determined as follows and used as appropriate. In FIG. 2, the direction in which the disk 110 faces the optical module 120, that is, the positive direction on the z-axis is defined as "up", and the negative direction on the z-axis is defined as "down". However, these directions vary depending on an installation mode of the encoder 100, and a positional relationship of each component of the encoder 100 is not limited.

2-1. Disk

Figure 3:
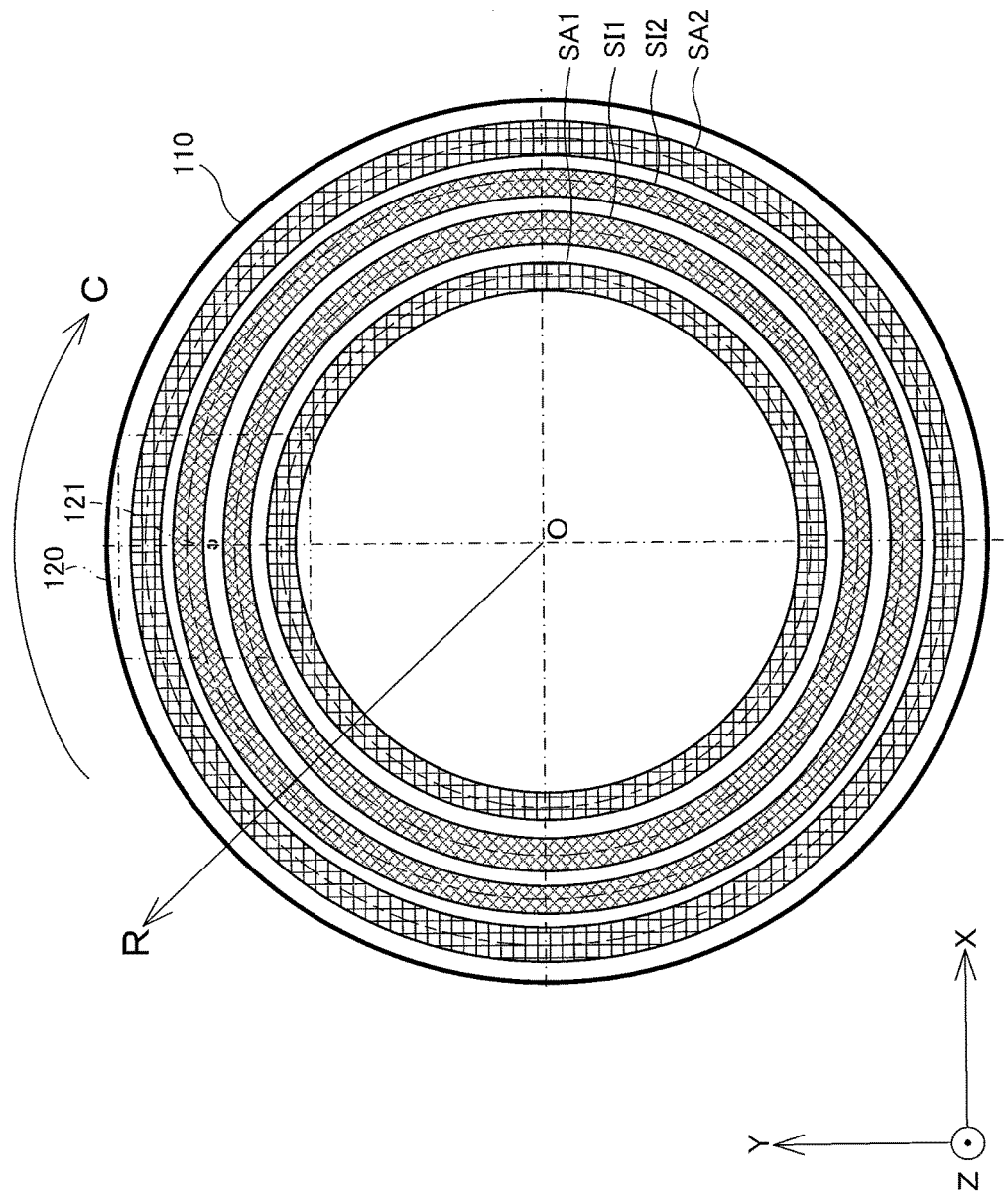
FIG. 3 is an explanatory diagram showing an example of a configuration of a disk of the encoder.

The disk 110 is formed in a disc shape as shown in FIG. 3, and is disposed such that a disk center O substantially coincides with the axis AX. The disk 110 is connected to the shaft SH of the motor M and rotates by the rotation of the shaft SH. While in this embodiment the disc-shaped disk 110 is taken as an example of a measurement target to measure rotation of the motor M, it is also possible to use some other members as the measurement target, examples including an end surface of the shaft SH. In the example shown in FIG. 2, the disk 110 is directly connected to the shaft SH, but may be connected through a connecting member such as a hub.

As shown in FIG. 3, the disk 110 has a plurality of slit tracks SA1, SA2, SI1, and SI2. Although the disk 110 rotates as the motor M is driven, the optical module 120 is fixedly disposed while facing a part of the disk 110. Accordingly, relative movement of the slit tracks SA1, SA2, SI1, and SI2 and the optical module 120 is performed in a measurement direction (direction of arrow C shown in FIG. 3, and hereinafter it is referred to as the "measurement direction C" as appropriate) as the motor M is driven.

Here, the "measurement direction" is a measurement direction when each slit track formed on the disk 110 is optically measured by the optical module 120. In the rotary type encoder in which the measurement target is the disk 110 as in this embodiment, the measurement direction coincides with a circumferential direction around the disk center O of the disk 110. On the other hand, for example, in a linear type encoder in which the measurement target is a linear scale or the like, the measurement direction coincides with a linear direction along the linear scale.

2-2. Optical Detection Mechanism

The optical detection mechanism includes the slit tracks SA1, SA2, SI1, and SI2 formed on the disk 110 and the optical module 120. The slit tracks are formed as tracks arranged on an upper surface of the disk 110 in a ring shape with the disk center O as the center. Each slit track has a plurality of reflection slits (diagonal hatched lines in FIG. 4) arranged along the measurement direction C over the entire circumference of the track. Each reflection slit reflects light emitted from the light source 121.

2-2-1. Disk

In this specification, the "slit" is a region formed on the disk 110 and giving an action such as reflection (including reflection type diffraction) and transmission (including transmission type diffraction) to the light emitted from the light source 121. Each slit track is configured by arranging a plurality of the slits so as to have a predetermined pattern along the measurement direction. In this embodiment, a case where each slit is a reflection slit will be described as an example.

Four slit tracks are provided on the upper surface of the disk 110 in the width direction (direction of arrow R shown in FIG. 3, and hereinafter it is referred to as the "width direction R" as appropriate). The "width direction" is a radial direction of the disk 110, that is, a direction substantially perpendicular to the measurement direction C, and the length of each slit track along the width direction R corresponds to the width of each slit track. The four slit tracks are arranged concentrically in the order of SAI, SI1, SI2, and SA2 from the inner side to the outer side in the width direction R. In order to explain each slit track in more detail, FIG. 4 shows a partially enlarged view of the vicinity of a region of the disk 110 facing the optical module 120.

Figure 4:
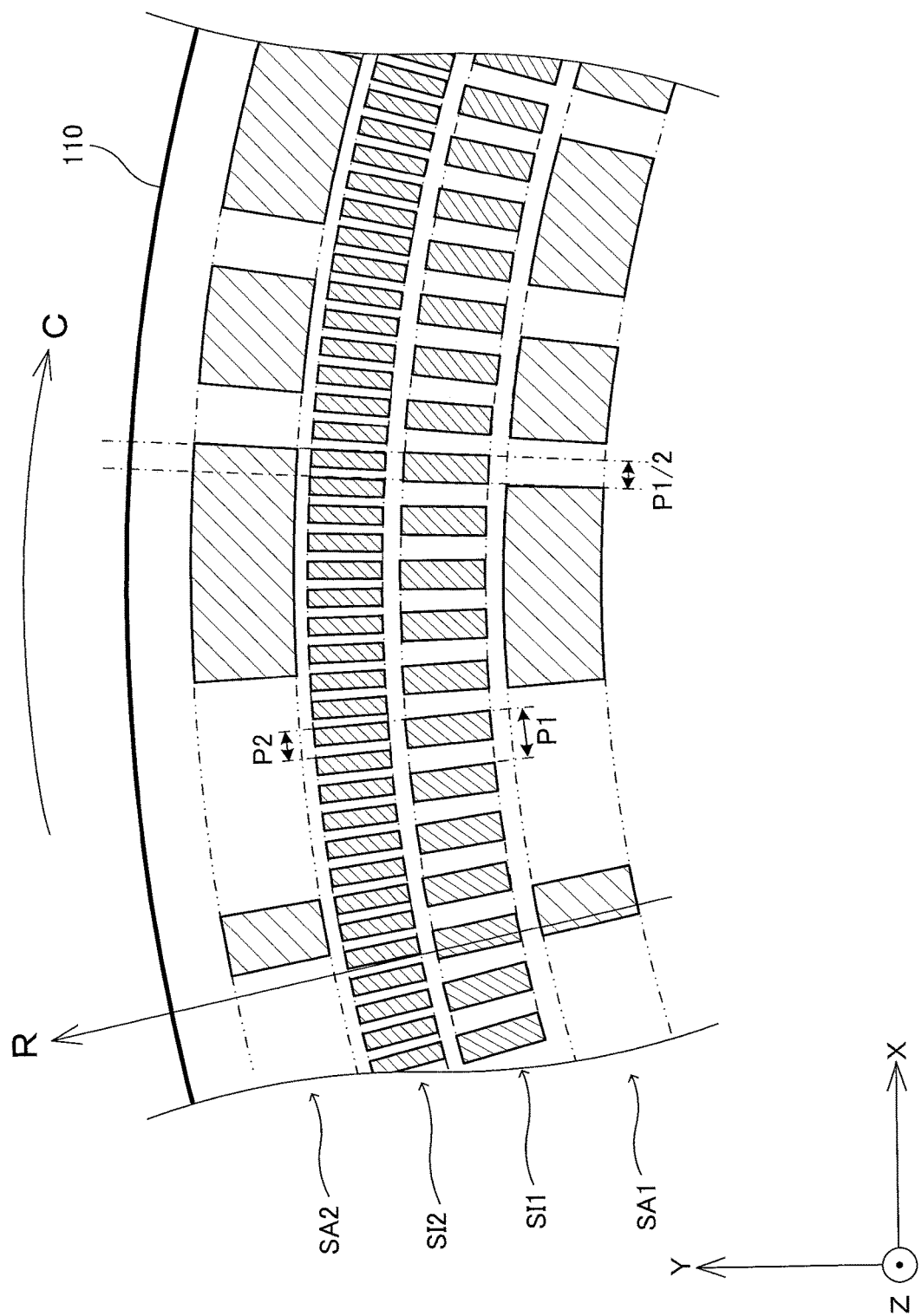
FIG. 4 is an explanatory diagram showing an example of a configuration of a slit track formed on the disk.

As shown in FIG. 4, the plurality of reflection slits included in the slit tracks SA1 and SA2 are arranged on the entire circumference of the disk 110 so as to have an absolute pattern in the measurement direction C.

The "absolute pattern" is a pattern in which the position, ratio, or the like of the reflection slit within an angle at which a light receiving array of the optical module 120 described later faces is uniquely determined within one rotation of the disk 110. That is, for example, in the case of the example of the absolute pattern shown in FIG. 4, when the motor M is at an angular position, a combination of bit patterns by detection or non-detection of each light receiving element of the light receiving arrays facing each other uniquely represents the absolute position of the angular position. The "absolute position" refers to an angular position with respect to the origin within one rotation of the disk 110. The origin is set at an appropriate angular position within one rotation of the disk 110, and an absolute pattern is formed with this origin as a reference.

According to an example of this pattern, it is possible to form a pattern that represents the absolute position of the motor M in a one-dimensional manner using bits whose number corresponds to the number of light receiving elements in the light receiving array. However, the absolute pattern is not limited to this example. For example, the absolute pattern may be a pattern represented in a multidimensional manner by bits whose number corresponds to the number of light receiving elements. In addition to a predetermined bit pattern, a pattern in which a physical quantity such as the amount of light received by the light receiving element and the phase changes so as to uniquely represent the absolute position, a pattern in which a code sequence of the absolute pattern is modulated, and other various patterns may be fanned.

In this embodiment, a similar absolute pattern is offset in the measurement direction C by, for example, a length of ½ of 1 bit, and formed as the two slit tracks SA1 and SA2. The offset amount corresponds to, for example, a half of a pitch P1 of the reflection slit of the slit track SI1. If the slit tracks SA1 and SA2 are not offset as described above, there is the following possibility. In other words, when the absolute position is represented by a one-dimensional absolute pattern as in this embodiment, detection accuracy for the absolute pattern may be lowered in the region of the transitions of the bit pattern due to the fact that the respective light receiving elements of the light receiving arrays PA1 and PA2 are located facing each other near an end of the reflection slit. In this embodiment, the slit tracks SA1 and SA2 are offset, so that, for example, when the absolute position by the slit track SA1 corresponds to the transition of the bit pattern, the absolute position is calculated using a detection signal from the slit track SA2 and vice versa, whereby the detection accuracy for the absolute position can be improved. In such a configuration, the amount of light received by the two light receiving arrays PA1 and PA2 needs to be uniform. However, in this embodiment, since the two light receiving arrays PA1 and PA2 are arranged at approximately the same distance from the light source 121, the above configuration can be realized.

Instead of offsetting the absolute patterns of the slit tracks SA1 and SA2 from one another, for example, the light receiving arrays PA1 and PA2 corresponding respectively to the slit tracks SA1 and SA2 may be offset in the measurement direction C from one another without offsetting the absolute patterns.

On the other hand, the plurality of reflection slits included in the slit tracks SI1 and SI2 are arranged on the entire circumference of the disk 110 so as to have an incremental pattern in the measurement direction C.

The "incremental pattern" is a pattern that is regularly repeated at a predetermined pitch as shown in FIG. 4. Here, the term "pitch" refers to an arrangement interval of the reflection slits in the slit tracks SI1 and SI2 having the incremental pattern. As shown in FIG. 4, the pitch of the slit track SI1 is P1, and the pitch of the slit track SI2 is P2. The incremental pattern is different from the absolute pattern that represents the absolute position using each presence or absence of detection according to a plurality of light receiving elements as a bit, and the incremental pattern represents the position of the motor M for each pitch or within one pitch depending on the sum of the detection signals from at least one light receiving element. Therefore, the incremental pattern does not represent the absolute position of the motor M, but can represent the position with very high accuracy compared to the absolute pattern.

In this embodiment, the pitch P1 of the slit track SI1 is set longer than the pitch P2 of the slit track SI2. In this example, each pitch is set so that $P1=2 \times P2$ is satisfied. That is, the number of reflection slits of the slit track SI2 is twice the number of reflection slits of the slit track SI1. However, the relationship of the slit pitch is not limited to this example, and can take various values such as three times, four times, and five times.

In this embodiment, a minimum length in the measurement direction C of the reflection slits of the slit tracks SA1 and SA2 matches the pitch P1 of the reflection slits of the slit track SI1. As a result, the resolution of the absolute signal based on the slit tracks SA1 and SA2 matches the number of reflection slits of the slit track SI1. However, the minimum length is not limited to this example, and it is desirable that the number of reflection slits of the slit track SI1 is set to be equal to or greater than the resolution of the absolute signal.

2-2-2. Optical Module

Figure 5:
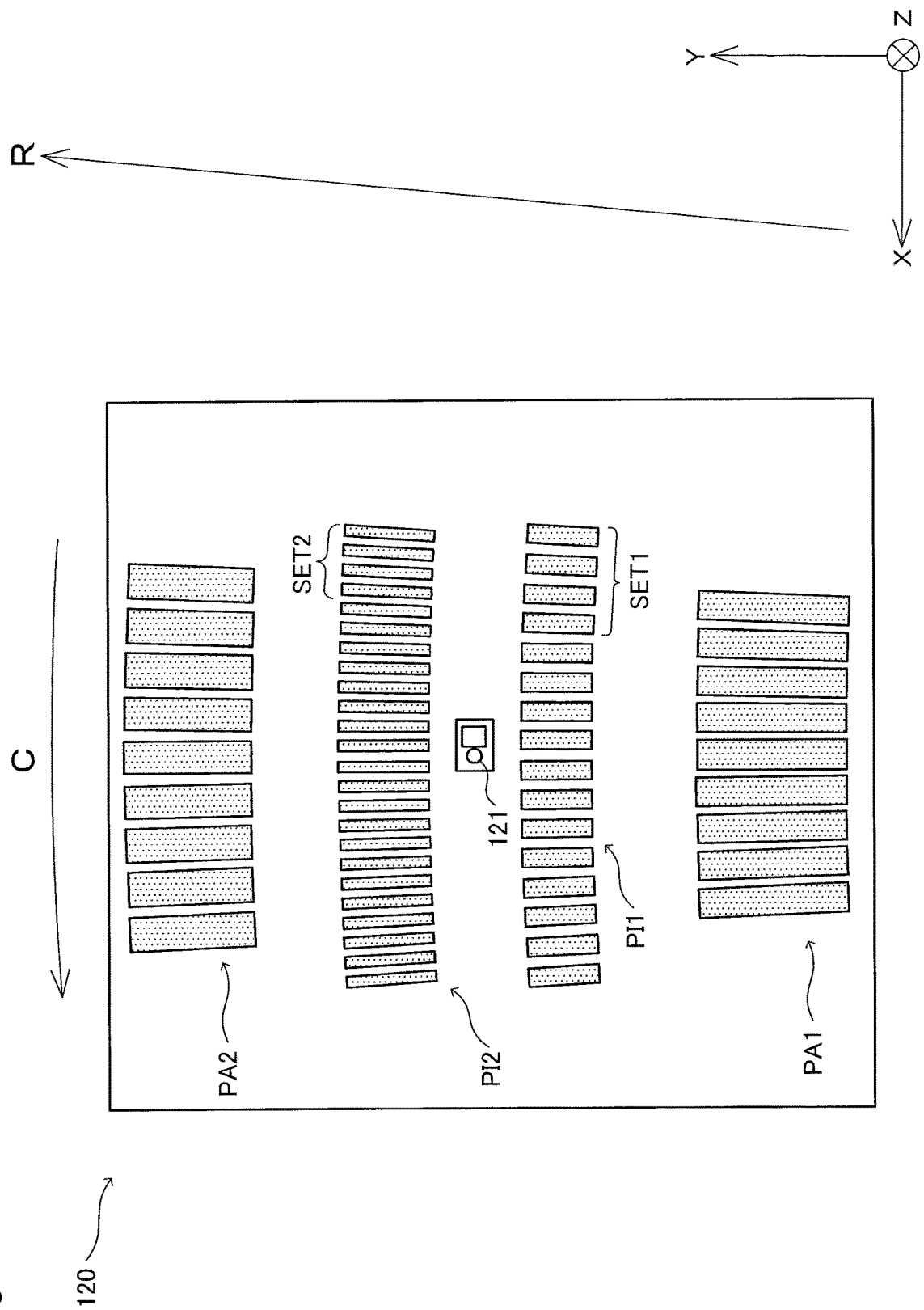
FIG. 5 is an explanatory diagram showing an example of a configuration of an optical module of the encoder.

As shown in FIGS. 2 and 5, the optical module 120 includes the light source 121 and a plurality of light receiving arrays PA1, PA2, PI1, and PI2 on a surface facing the disk 110.

As shown in FIG. 3, the light source 121 is disposed at a position facing a space between the slit track SI1 and the slit track SI2. The light source 121 applies light to a portion of the four slit tracks SA1, SA2, SI1, and SI2 that pass through a position facing the optical module 120.

The light source 121 is not particularly limited as long as it is a light source capable of applying light to an irradiated region. For example, an LED (Light Emitting Diode) can be used. The light source 121 is configured as a point light source in which no optical lens or the like is particularly disposed, and emits diffused light from a light emitting section.

The plurality of light receiving arrays PA1, PA2, PI1, and PI2 are arranged around the light source 121 and have a plurality of light receiving elements (dot hatched portions in FIG. 5) that each receive light reflected by the reflection slit of the associated slit track. The plurality of light receiving elements are arranged along the measurement direction C as shown in FIG. 5. As each light receiving element, for example, a photodiode can be used. However, the light receiving element is not limited to a photodiode, and is not particularly limited as long as it can receive light emitted from the light source 121 and convert the light into an electrical signal.

The light receiving array in this embodiment is disposed corresponding to the four slit tracks SA1, SA2, SI1, and SI2. The light receiving array PA1 is configured to receive light reflected by the slit track SA1, and the light receiving array PA2 is configured to receive light reflected by the slit track SA2. The light receiving array PH is configured to receive light reflected by the slit track SI1, and the light receiving array PI2 is configured to receive light reflected by the slit track SI2.

The light source 121, the light receiving arrays PA1 and PA2, and the light receiving arrays PI1 and PI2 are arranged in positional relationship shown in FIG. 5. The light receiving arrays PA1 and PA2 corresponding to the absolute pattern are arranged in the width direction R with the light source 121 interposed therebetween. In this example, the light receiving array PA1 is disposed on the inner peripheral side, and the light receiving array PA2 is disposed on the outer peripheral side. In this embodiment, the distances between each of the light receiving arrays PA1 and PA2 and the light source 121 are substantially equal. The plurality of light receiving elements included in the light receiving arrays PA1 and PA2 are arranged at a constant pitch along the measurement direction C, respectively. The light receiving arrays PA1 and PA2 receive the reflected light from the slit tracks SA1 and SA2, respectively, thereby generating an absolute signal having a bit pattern corresponding to the number of light receiving elements (for example, 9 in this embodiment).

The light receiving arrays PI1 and PI2 corresponding to the incremental pattern are arranged at positions offset from each other in the width direction R. The light receiving array PI1 is disposed between the light receiving array PA1 and the light source 121. The light receiving array PI2 is disposed between the light receiving array PA2 and the light source 121. The light receiving array PI1 is disposed on the inner peripheral side with respect to the light receiving array PI2. The distances between each of the light receiving arrays PI1 and PI2 and the light source 121 are substantially equal.

In this embodiment, since a one-dimensional pattern is illustrated as an absolute pattern, the corresponding light receiving arrays PA1 and PA2 have a plurality of (for example, 9 in this embodiment) light receiving elements arranged along the measurement direction C so as to receive the light reflected by the reflection slits of the associated slit tracks SA1 and SA2. In the plurality of light receiving elements, as described above, each light reception or non-light reception is treated as a bit and represents an absolute position of 9 bits. Therefore, light reception signals received by each of the plurality of light receiving elements are handled independently from each other by the control unit 130, and the absolute position encrypted (encoded) into a serial bit pattern is decoded from a combination of the light reception signals. The light receiving signals of the light receiving arrays PA1 and PA2 are referred to as "absolute signals". When an absolute pattern different from this embodiment is used, the light receiving arrays PA1 and PA2 have a configuration corresponding to the pattern.

The light receiving arrays PI1 and PI2 have a plurality of light receiving elements arranged along the measurement direction C so as to receive the light reflected by the reflection slits of the associated slit tracks SI1 and SI2. First, the light receiving array PI1 will be described as an example.

In this embodiment, a set of four light receiving elements in total (shown as "SET1" in FIG. 5) is arranged in one pitch of the incremental pattern (one pitch in a projected image) of the slit track SI1, and a plurality of sets of four light receiving elements are further arranged along the measurement direction C. Since the incremental pattern is a repetition of the reflection slits formed on a one-pitch basis, the light receiving elements each generate a periodic signal having one period (referred to as 360° in electrical angle) for one pitch, when the disk 110 rotates. Also, since four light receiving elements are arranged in one set, which corresponds to one pitch, adjacent light receiving elements in one set detect periodic signals having a phase difference of 90° from each other. Each different one of the light receiving signals is referred to as an A phase signal, a B phase signal (a phase difference relative to the A phase signal is 90°), an inverse-of-A-phase signal (a phase difference relative to the A phase signal is 180°), and an inverse-of-B-phase signal (a phase difference relative to the B phase signal is 180°).

The incremental pattern indicates positions in one pitch, and the signals of the different phases in one set each exhibit a value that changes in a similar manner with respect to the corresponding one of the signals of the different phases in another set. Thus, the signals of the same phases are added together across the plurality of sets. Thus, four signals that are phase-shifted with respect to each other by 90° are detected from the large number of light receiving elements of the light receiving array PI1 shown in FIG. 5.

On the other hand, the light receiving array PI2 is configured similarly to the light receiving array PI1. That is, a set of four light receiving elements in total (shown as "SET2" in FIG. 5) is arranged in one pitch of the incremental pattern (one pitch in a projected image) of the slit track SI2, and a plurality of sets of four light receiving elements are arranged along the measurement direction C. Thus, four signals that are phase-shifted with respect to each other by 90° are generated from the light receiving arrays PI1 and PI2. These four signals are referred to as "incremental signals". Since the incremental signal generated by the light receiving array PI2 corresponding to the slit track SI2 with a short pitch is higher in resolution than other incremental signals, this incremental signal is referred to as the "high incremental signal". Since the incremental signal generated by the light receiving array PI1 corresponding to the slit track SI1 with a long pitch is lower in resolution than other incremental signals, this incremental signal is referred to as the "low incremental signal".

In this embodiment, the case where one set corresponding to one pitch of the incremental pattern includes four light receiving elements will be described as an example. However, for example, one set may include two light receiving elements, and the number of the light receiving elements in one set is not particularly limited.

2-3. Control Unit

Next, an example of the functional configuration of the control unit 130 and the waveform of each signal will be described with reference to FIGS. 6 to 13.

At the timing of measuring the absolute position of the motor M, the control unit 130 acquires, from the optical module 120, two absolute signals each including a bit pattern representing the absolute position and the high incremental signal and the low incremental signal including four signals whose phases are shifted by 90°. The timing of measuring the absolute position is, for example, a time when the encoder 100 is turned on or a time of the subsequent check processing. The check processing is a processing of measuring the absolute position, and the absolute position is measured when the power is turned on in the encoder 100, and then the position data is calculated using a relative position detected based on the absolute position and the incremental pattern. In order to check the calculated position data, the check processing is periodically performed at a predetermined timing.

Then, based on a selected one or a previously specified one of the two absolute signals and the two incremental signals, the control unit 130 calculates the absolute position of the motor M represented by these signals, generates the position data representing the absolute position, and outputs the position data to the control device CT. After measuring the absolute position (for example, after the power of the encoder 100 is turned on and then the motor M starts rotating), the control unit 130 generates the position data based on the calculated absolute position and a relative position calculated based on the high incremental signal and the low incremental signal and outputs the position data to the control device CT. Thereafter, the above-described check processing may be performed periodically, and accuracy of the position data may be checked by comparing the measured absolute position with the calculated position data.

Figure 6:
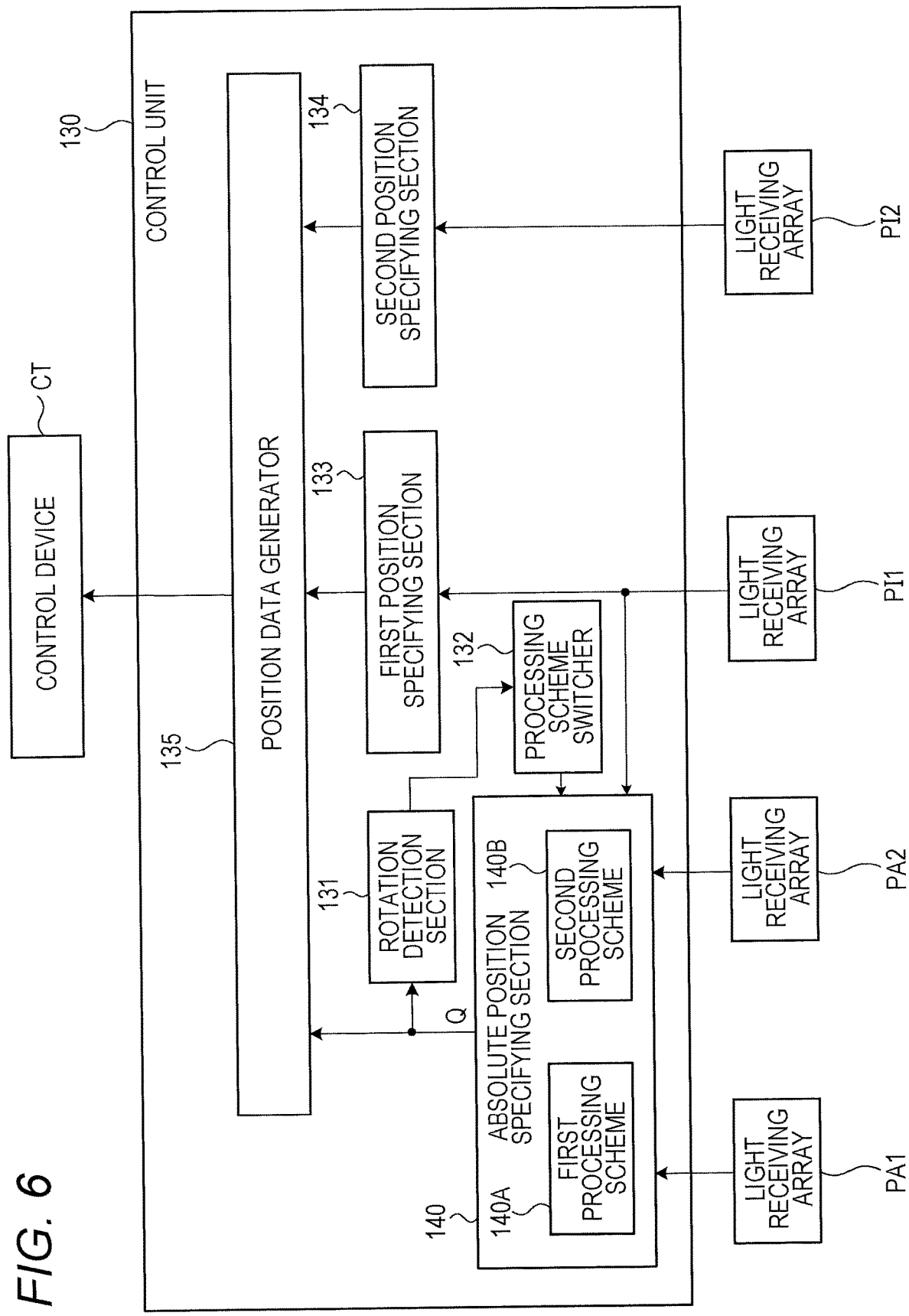
FIG. 6 is a block diagram showing an example of a functional configuration of a control unit.

As shown in FIG. 6, the control unit 130 includes an absolute position specifying section 140, a rotation detection section 131, a processing scheme switcher 132, a first position specifying section 133, a second position specifying section 134, and a position data generator 135.

The absolute position specifying section 140 specifies the absolute position based on the absolute signals of the light receiving arrays PA1 and PA2 (the output signals from the nine light receiving elements) and the incremental signal of the light receiving array PI1. The absolute position specifying section 140 has a first processing scheme 140A and a second processing scheme 140B, which are different from each other, as a processing scheme for specifying the absolute position, in other words, a processing scheme for generating a signal Q representing the absolute position. Details of this will be described later.

The rotation detection section 131 detects presence or absence of rotation of the disk 110. Specifically, whether or not the signal Q representing the absolute position has changed is detected, and when the signal Q representing the absolute position does not change, it is determined that there is no rotation of the disk 110. When the signal Q representing the absolute position has changed, it is determined that there is rotation of the disk 110.

The processing scheme switcher 132 sets the processing scheme of the absolute position specifying section 140 to the first processing scheme 140A as an initial setting. When the signal Q representing the absolute position generated by the first processing scheme 140A does not change (when there is no rotation of the disk 110), the first processing scheme 140A is maintained. When the signal Q representing the absolute position has changed (when there is rotation of the disk 110), the processing scheme of the absolute position specifying section 140 is switched from the first processing scheme 140A to the second processing scheme 140B.

The first position specifying section 133 performs subtraction between the low incremental signals having a phase difference of 180° among the low incremental signals of the four phases from the light receiving array PI1. By performing the subtraction on any signals between which the phase difference is 180° in this way, it is possible to cancel out manufacture errors or measurement errors of the reflection slit within one pitch. The signals resulting from the subtraction as described above are referred to herein as a "first incremental signal" and a "second incremental signal." The first incremental signal and the second incremental signal have a phase difference of 90° from each other in terms of electric angle (simply referred to as the "A-phase signal" and the "B-phase signal"). Thus, from these two signals, the first position specifying section 133 specifies a position within one pitch. A method of specifying the position within one pitch is not particularly limited. For example, when the low incremental signal that is a periodic signal is a sinusoidal signal, as an example of the above specifying method, there is a method of performing the arctan calculation using division results of two sinusoidal signals of A- and B-phases to obtain an electrical angle φ. Alternatively, there is a method of converting the two sinusoidal signals into the electrical angle φ using a tracking circuit. Alternatively, there is a method of specifying the electrical angle φ associated with the values of A- and B-phase signals based on a previously prepared table. At this time, the first position specifying section 133 preferably performs analog to digital conversion on the two sinusoidal signals of A- and B-phases for each of the detection signals.

The second position specifying section 134 performs the same processing as the above-described first position specifying section 133 on the high incremental signal from the light receiving array PI2, and specifies a highly accurate position within one pitch from the two signals.

The position data generator 135 superimposes the first position data specified by the first position specifying section 133 on the absolute position Q specified by the absolute position specifying section 140. This makes it possible to calculate an absolute position with higher resolution than the absolute position based on the absolute signal. The position data generator 135 superimposes the second position data specified by the second position specifying section 134 on the absolute position calculated based on the low incremental signal. Accordingly, it is possible to calculate an absolute position with higher resolution than the absolute position calculated based on the low incremental signal. Then, the position data generator 135 has the absolute position thus calculated undergo multiplication processing, to thereby further improve resolution, and generates position data representing a highly accurate absolute position.

The position data generator 135 outputs the position data representing the highly accurate absolute position thus generated to the control device CT.

Figure 7:
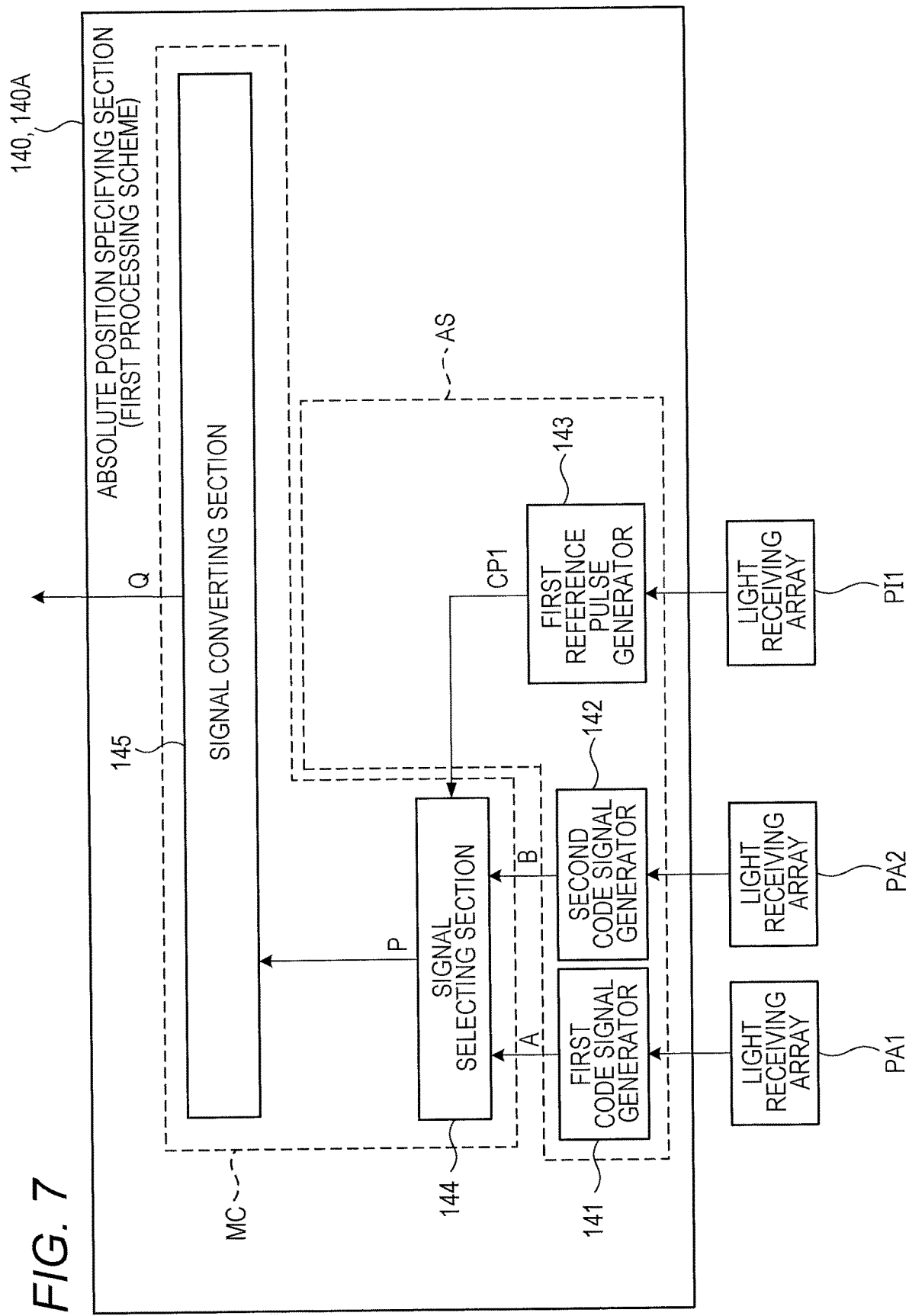
FIG. 7 is a block diagram showing an example of a functional configuration in a first processing scheme of an absolute position specifying section.

As shown in FIG. 7, the absolute position specifying section 140 switched to the first processing scheme 140A includes a first code signal generator 141, a second code signal generator 142, a first reference pulse generator 143, a signal selecting section 144 and a signal converting section 145.

The first code signal generator 141 generates a first code signal A based on the absolute pattern. Specifically, the first code signal generator 141 compares each amplitude of the absolute signal (the output signals from the nine light receiving elements) of the light receiving array PA1 with a predetermined threshold value. When the amplitude exceeds the threshold value, it is judged as detection, and when the amplitude does not exceed the threshold value, it is judged as non-detection, to binarize the absolute signal and thus to convert the signal into bit data representing the absolute position, thereby generating the first code signal A.

The second code signal generator 142 generates a second code signal B having a phase difference of 180° in terms of electric angle (electric angle of the first reference pulse CP1) from the first code signal A based on the absolute pattern. Specifically, the second code signal generator 142 compares each amplitude of the absolute signal (the output signals from the nine light receiving elements) of the light receiving array PA2 with a predetermined threshold value. When the amplitude exceeds the threshold value, it is judged as detection, and when the amplitude does not exceed the threshold value, it is judged as non-detection, to binarize the absolute signal and thus to convert the signal into bit data representing the absolute position, thereby generating the second code signal B.

The first reference pulse generator 143 generates the first reference pulse CP1 based on the incremental pattern. Specifically, the first reference pulse generator 143 compares each amplitude of the low incremental signal (first incremental signal) of the light receiving array PI1 with a predetermined threshold value (for example, 0). Assuming that when the amplitude exceeds the threshold value, it is defined as "High", and when the amplitude does not exceed the threshold value, it is defined as "Low", the first reference pulse generator 143 generates the first reference pulse CP1.

Based on the first reference pulse CP1 generated by the first reference pulse generator 143, the signal selecting section 144 selects one of the first code signal A generated by the first code signal generator 141 and the second code signal B generated by the second code signal generator 142, and outputs the selected signal as a code signal P. Details of this will be described with reference to FIG. 9.

Figure 9:
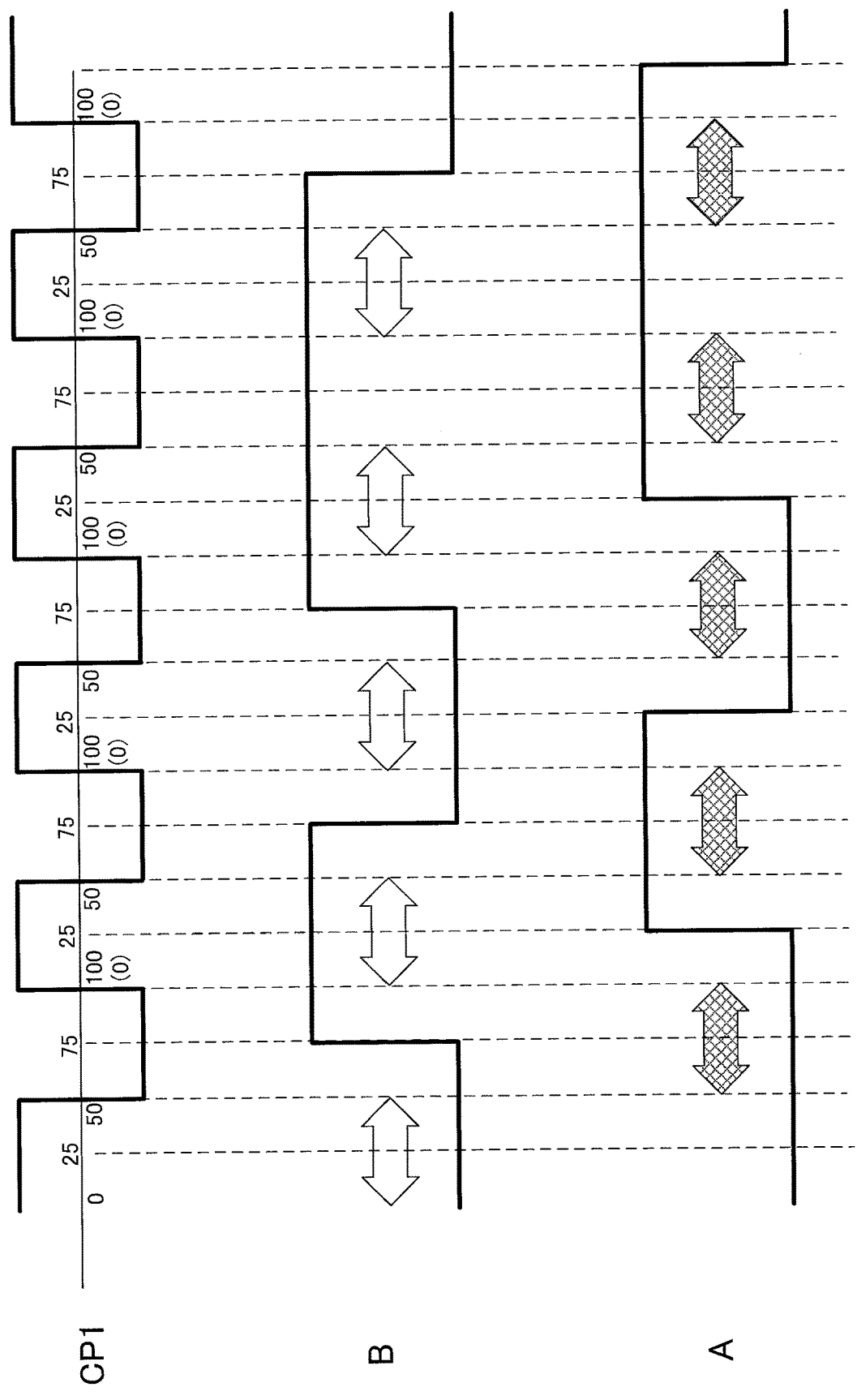
FIG. 9 is an explanatory diagram illustrating an example of waveforms of a first reference pulse, a first code signal, and a second code signal.

FIG. 9 is an explanatory diagram illustrating an example of waveforms of the first reference pulse CP1, the first code signal A, and the second code signal B. In FIG. 9, the number in the first reference pulse CP1 in the upper stage represents a magnitude of the phase when one period (360° in electrical angle) is 100%. The second code signal B in the middle stage is a waveform of a code signal based on the light receiving signal output from one light receiving element in the light receiving array PA2. The first code signal A in the lower stage is a waveform of a code signal based on a light receiving signal output from one light receiving element in the light receiving array PA1 (light receiving element corresponding to the light receiving element of the light receiving array PA2).

In the example shown in FIG. 9, the waveform of the second code signal B transits from on to off when the phase of the first reference pulse CP1 is 75%. On the other hand, as described above, the absolute patterns of the slit tracks SA1 and SA2 are formed by being offset in the measurement direction C by half of the pitch P1 (phase difference 50%). For this reason, in the waveform of the first code signal A, the phase is shifted by 50% with respect to the waveform of the second code signal B (in this example, the phase is delayed corresponding to the measurement direction C).

The signal selecting section 144 selects the second code signal B when the phase of the first reference pulse CP1 is in a range of "High" (phase range of 0% to 50%. White double-headed arrow in FIG. 9). On the other hand, the signal selecting section 144 selects the first code signal A when the phase of the first reference pulse CP1 is in a range of "Low" (phase range of 50% to 100%. Cross hatched double-headed arrow in FIG. 9). In this way, the code signal P is generated. As a result, the absolute position can be specified using the code signal that is not in a region where the amplitude is unstable, such as a change point of a detection pattern, so that the detection accuracy can be improved.

Returning to FIG. 7, the signal converting section 145 refers to a correspondence relation between predetermined bit data and the absolute position, converts one of the first code signal A and the second code signal B, which is selected based on the first reference pulse CP1 by the signal selecting section 144, into a signal Q representing the absolute position, and outputs the signal Q to the position data generator 135.

Figure 10:
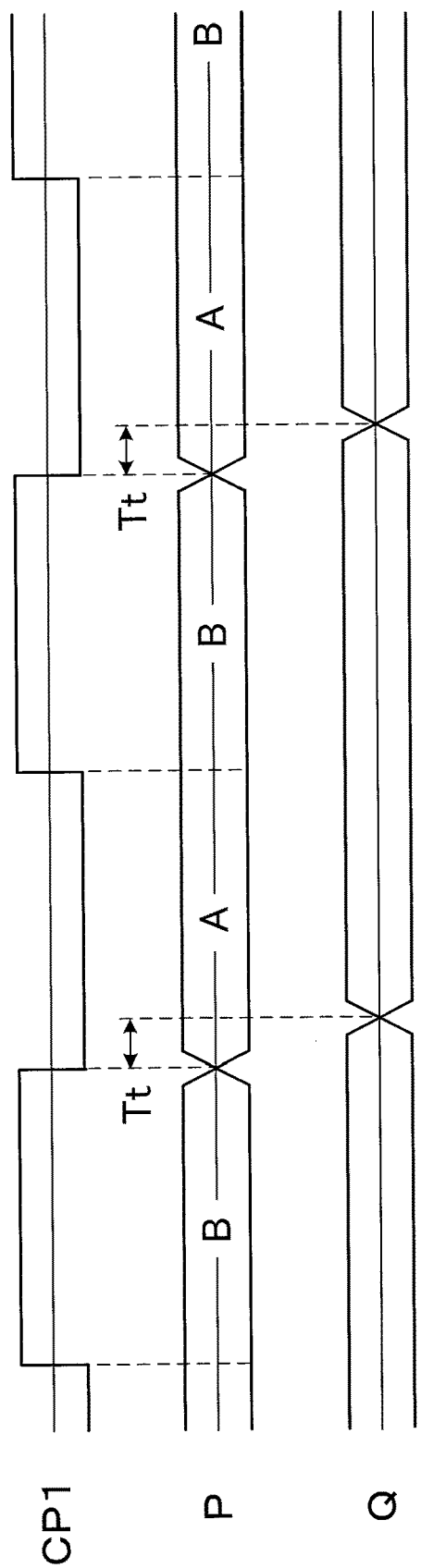
FIG. 10 is a timing chart showing an example of waveforms of the first reference pulse, a code signal, and a signal representing an absolute position during forward rotation in the first processing scheme.
Figure 11:
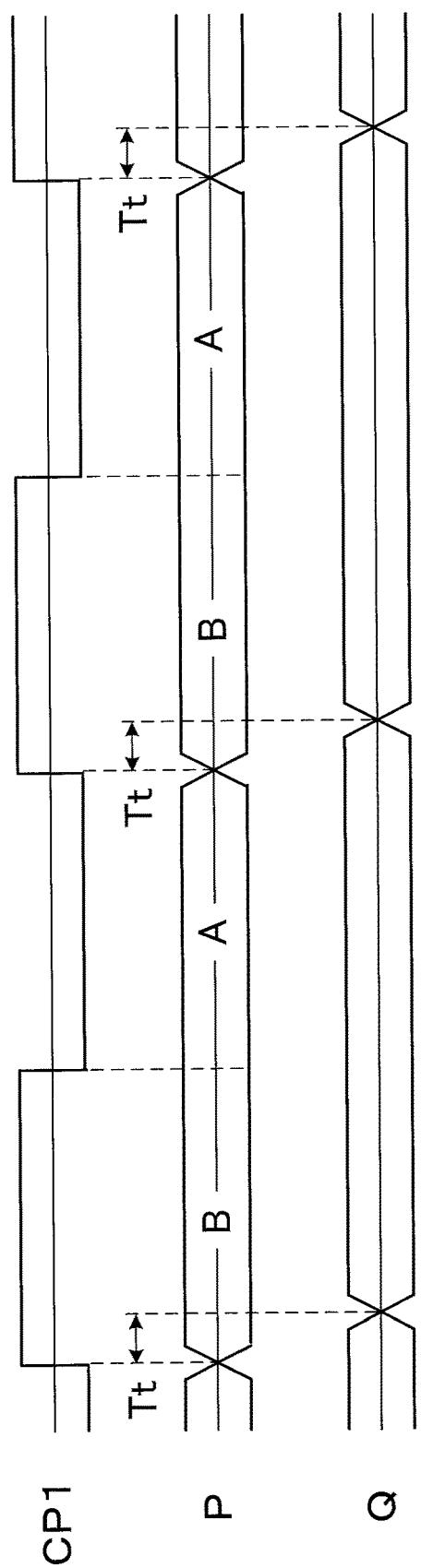
FIG. 11 is a timing chart showing an example of waveforms of the first reference pulse, the code signal, and the signal representing the absolute position during backward rotation in the first processing scheme.

FIGS. 10 and 11 are timing charts showing an example of waveforms of the first reference pulse CP1, the code signal P, and the signal Q representing the absolute position in the first processing scheme. FIG. 10 shows a waveform when the motor M is rotating forward, and FIG. 11 shows a waveform when the motor M is rotating backward.

As shown in FIG. 10, during forward rotation, the value of the code signal P is changed when the first reference pulse CP1 falls. In addition, as described above, when the phase of the first reference pulse CP1 is in the range of "High", the code signal P has the value of the second code signal B, and when the phase of the first reference pulse CP1 is in the range of "Low" of the first reference pulse CP1, the code signal P has the value of the first code signal A. The value of the signal Q representing the absolute position is changed so that the signal Q is delayed with respect to the code signal P by a delay time Tt due to conversion processing in the signal converting section 145.

As shown in FIG. 11, during backward rotation, the value of the code signal P is changed when the first reference pulse CP1 rises. In addition, as described above, when the phase of the first reference pulse CP1 is in the range of "High", the code signal P has the value of the second code signal B, and when the phase of the first reference pulse CP1 is in the range of "Low" of the first reference pulse CP1, the code signal P has the value of the first code signal A. The value of the signal Q representing the absolute position is changed so that the signal Q is delayed with respect to the code signal P by a delay time Tt due to conversion processing in the signal converting section 145.

Figure 8:
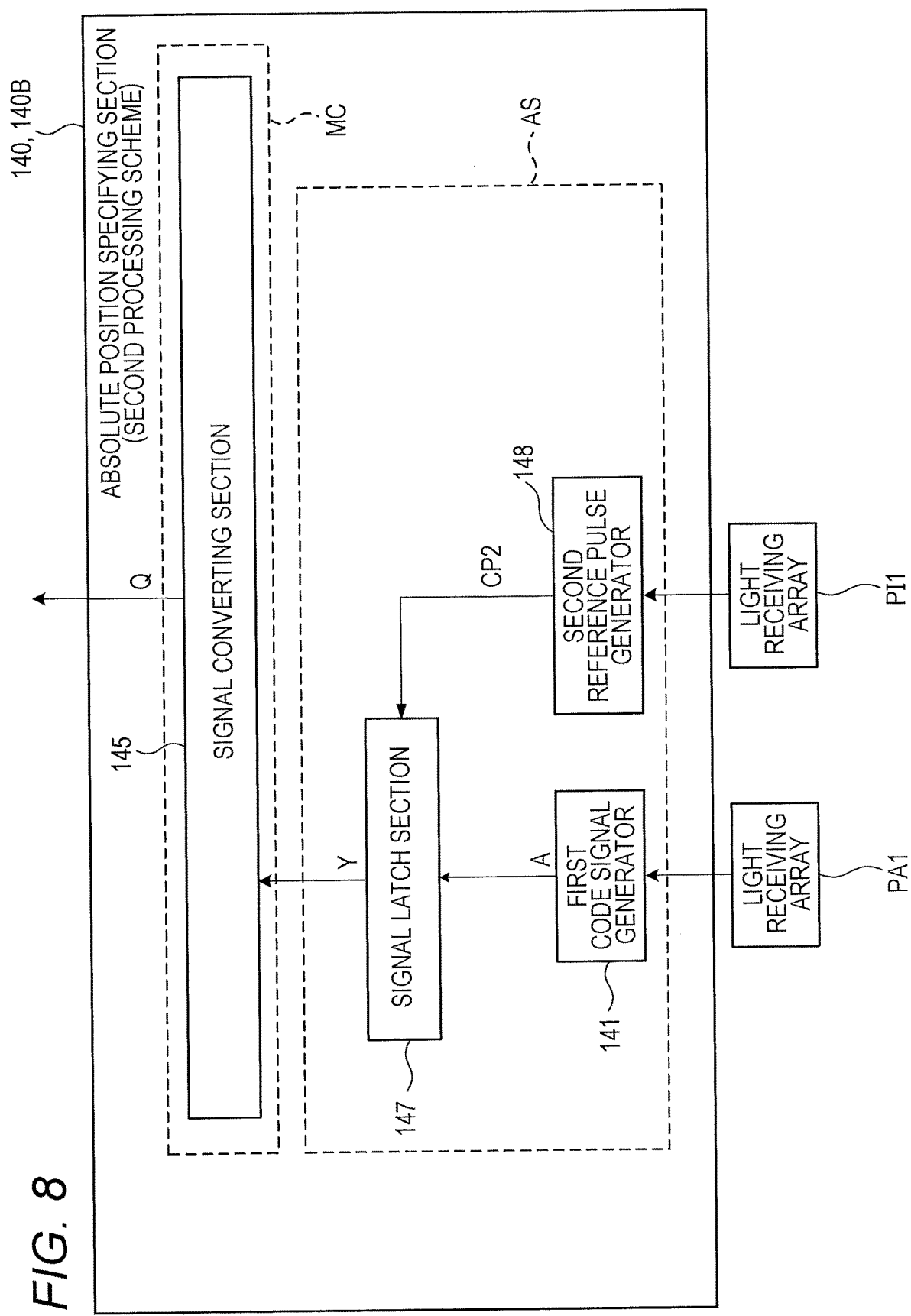
FIG. 8 is a block diagram showing an example of a functional configuration in a second processing scheme of the absolute position specifying section.

As shown in FIG. 8, the absolute position specifying section 140 switched to the second processing scheme 140B includes the first code signal generator 141, a second reference pulse generator 148, the signal converting section 145, and a signal latch section 147.

The second reference pulse generator 148 generates the second reference pulse CP2 having a phase difference of 90° in terms of electric angle from the first reference pulse CP1 based on the incremental pattern. Specifically, the second reference pulse generator 148 compares each amplitude of the low incremental signal (second incremental signal) of the light receiving array PH with a predetermined threshold value (for example, 0). Assuming that when the amplitude exceeds the threshold value, it is defined as "High", and when the amplitude does not exceed the threshold value, it is defined as "Low", the second reference pulse generator 148 generates the second reference pulse CP2.

Based on the second reference pulse CP2 generated by the second reference pulse generator 148, the signal latch section 147 latches a previously specified (selected) one of the first code signal A and the second code signal B, that is, the first code signal A in this example, and outputs the signal as a latched signal Y to the signal converting section 145. In this embodiment, the case where the first code signal A is used will be described. However, the second code signal B may be used.

The signal converting section 145 refers to a correspondence relation between the predetermined bit data and the absolute position, converts the signal Y latched by the signal latch section 147 into a signal Q representing the absolute position, and outputs the signal Q to the position data generator 135.

Figure 12:
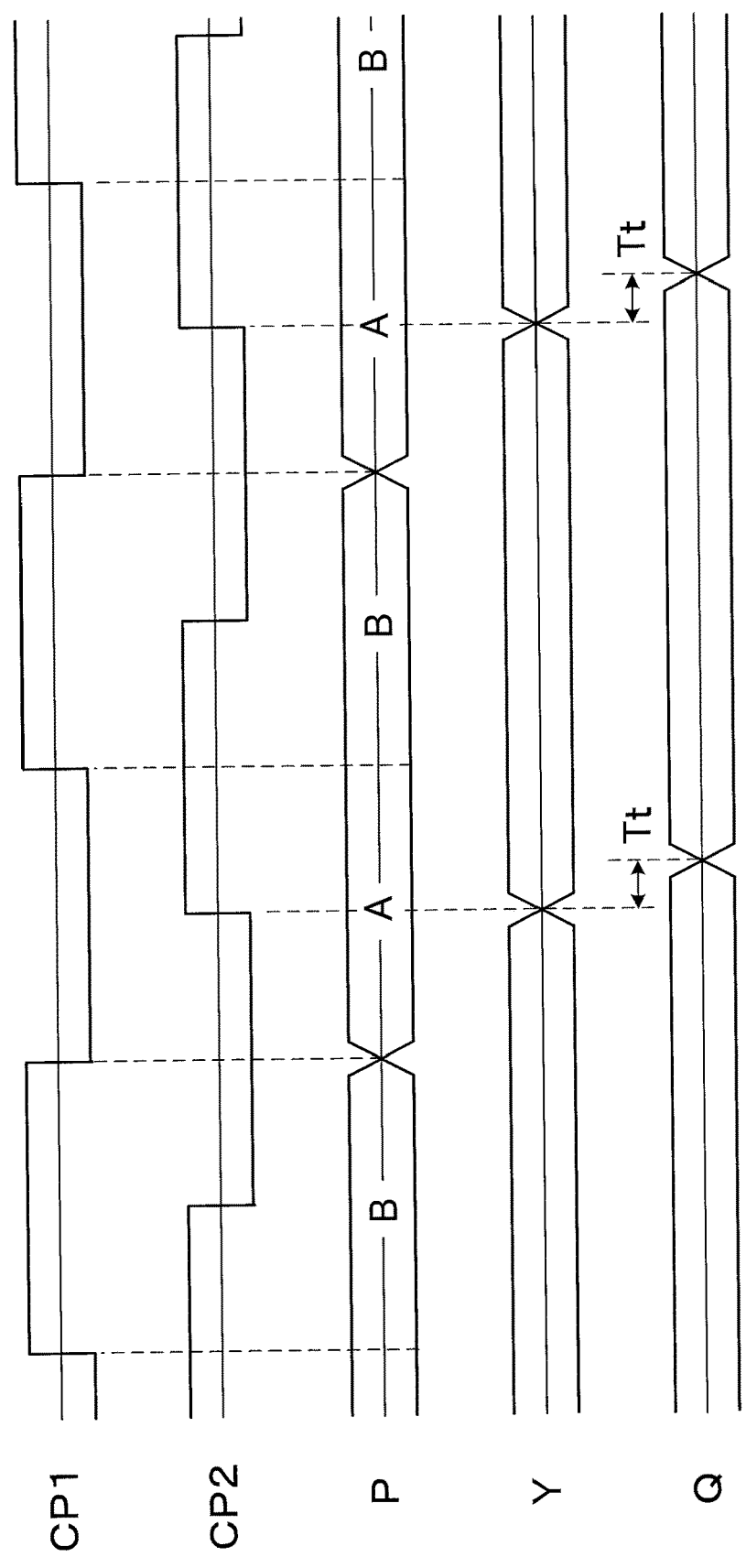
FIG. 12 is a timing chart showing an example of waveforms of the first reference pulse, the second reference pulse, the code signal, a latched signal, and the signal representing the absolute position during forward rotation in the second processing scheme.
Figure 13:
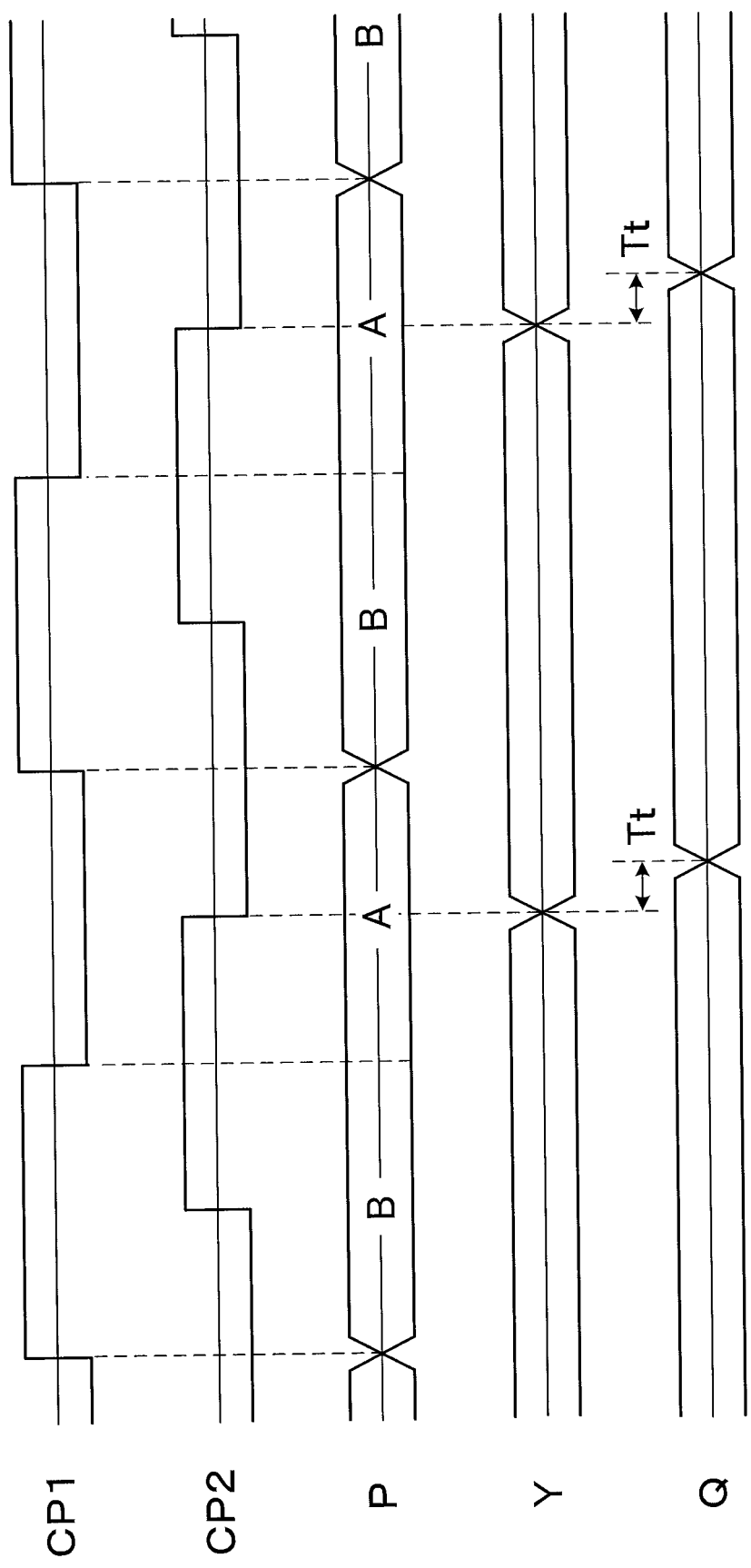
FIG. 13 is a timing chart showing an example of waveforms of the first reference pulse, the second reference pulse, the code signal, the latched signal, and the signal representing the absolute position during backward rotation in the second processing scheme.

FIGS. 12 and 13 are timing charts showing an example of waveforms of the first reference pulse CP1, the second reference pulse CP2, the code signal P, the latched signal Y, and the signal Q representing the absolute position in the second processing scheme. FIG. 12 shows a waveform when the motor M is rotating forward, and FIG. 13 shows a waveform when the motor M is rotating backward.

As shown in FIG. 12, during forward rotation, the value of the code signal P is changed when the first reference pulse CP1 falls. In addition, when the phase of the first reference pulse CP1 is in the range of "High", the code signal P has the value of the second code signal B, and when the phase of the first reference pulse CP1 is in the range of "Low" of the first reference pulse CP1, the code signal P has the value of the first code signal A. The value of the code signal P is latched when the second reference pulse CP2 rises, and is output as the latched signal Y. Since the second reference pulse CP2 has a phase difference of 90° in terms of electric angle from the first reference pulse CP1 (in this example, the phase is advanced by 90°), the value of the first code signal A can be latched at the timing near the center of the switching timing, and a margin for phase fluctuation between the reference pulses CP1 and CP2 and the signal Q representing the absolute position due to the rotation of the disk 110 can be increased. The value of the signal Q representing the absolute position is changed so that the signal Q is delayed with respect to the latched signal Y by the delay time Tt due to conversion processing in the signal converting section 145.

As shown in FIG. 13, during backward rotation, the value of the code signal P is changed when the first reference pulse CP1 rises. In addition, when the phase of the first reference pulse CP1 is in the range of "High", the code signal P has the value of the second code signal B, and when the phase of the first reference pulse CP1 is in the range of "Low" of the first reference pulse CP1, the code signal P has the value of the first code signal A. The value of the code signal P is latched when the second reference pulse CP2 falls, and is output as the latched signal Y. Since the second reference pulse CP2 has a phase difference of 90° in terms of electric angle from the first reference pulse CP1 (in this example, the phase is delayed by 90°), the value of the first code signal A can be latched at the timing near the center of the switching timing, and a margin for phase fluctuation between the reference pulses CP1 and CP2 and the signal Q representing the absolute position due to the rotation of the disk 110 can be increased. The value of the signal Q representing the absolute position is changed so that the signal Q is delayed with respect to the latched signal Y by the delay time Tt due to conversion processing in the signal converting section 145.

In each processing section of the control unit 130 described above (the absolute position specifying section 140, the rotation detection section 131, the processing scheme switcher 132, etc.), and each processing section of the absolute position specifying section 140 (the first code signal generator 141, the second code signal generator 142, the first reference pulse generator 143, the second reference pulse generator 148, etc.), the processing or the like is not limited to the example of sharing of the processing. For example, the processing may be performed by a smaller number of processing sections (for example, one processing section) or may be performed by a further subdivided processing section. Each function of the control unit 130 may be implemented by a program executed by a CPU 901 (see FIG. 17) to be described later, or a part or the whole thereof may be implemented with an actual device such as ASIC, FPGA or another electric circuit.

In this embodiment, as shown in FIGS. 7 and 8, out of the absolute position specifying section 140, the first code signal generator 141, the second code signal generator 142, the first reference pulse generator 143, the second reference pulse generator 148, the signal latch section 147, and the like are mounted on a common integrated circuit by, for example, ASIC (in FIGS. 7 and 8, the mounting range by the ASIC is indicated by AS). These may be mounted on common integrated circuit. In addition to the ASIC, these may be mounted on a dedicated integrated circuit constructed for a specific application, such as an FPGA, or may be mounted by a program implemented by a common processor (for example, CPU 901). Of the absolute position specifying section 140, the signal selecting section 144, the signal converting section 145, and the like are mounted by, for example, a program executed by a microcomputer processor (in FIGS. 7 and 8, the mounting range by the microcomputer is indicated by MC). Some or all of these may be mounted by an actual device such as an ASIC, FPGA, or other electric circuit.

2-4. Processing Procedure By Control Unit

Next, an example of a processing procedure executed by the control unit 130 will be described with reference to FIG. 14.

Figure 14:
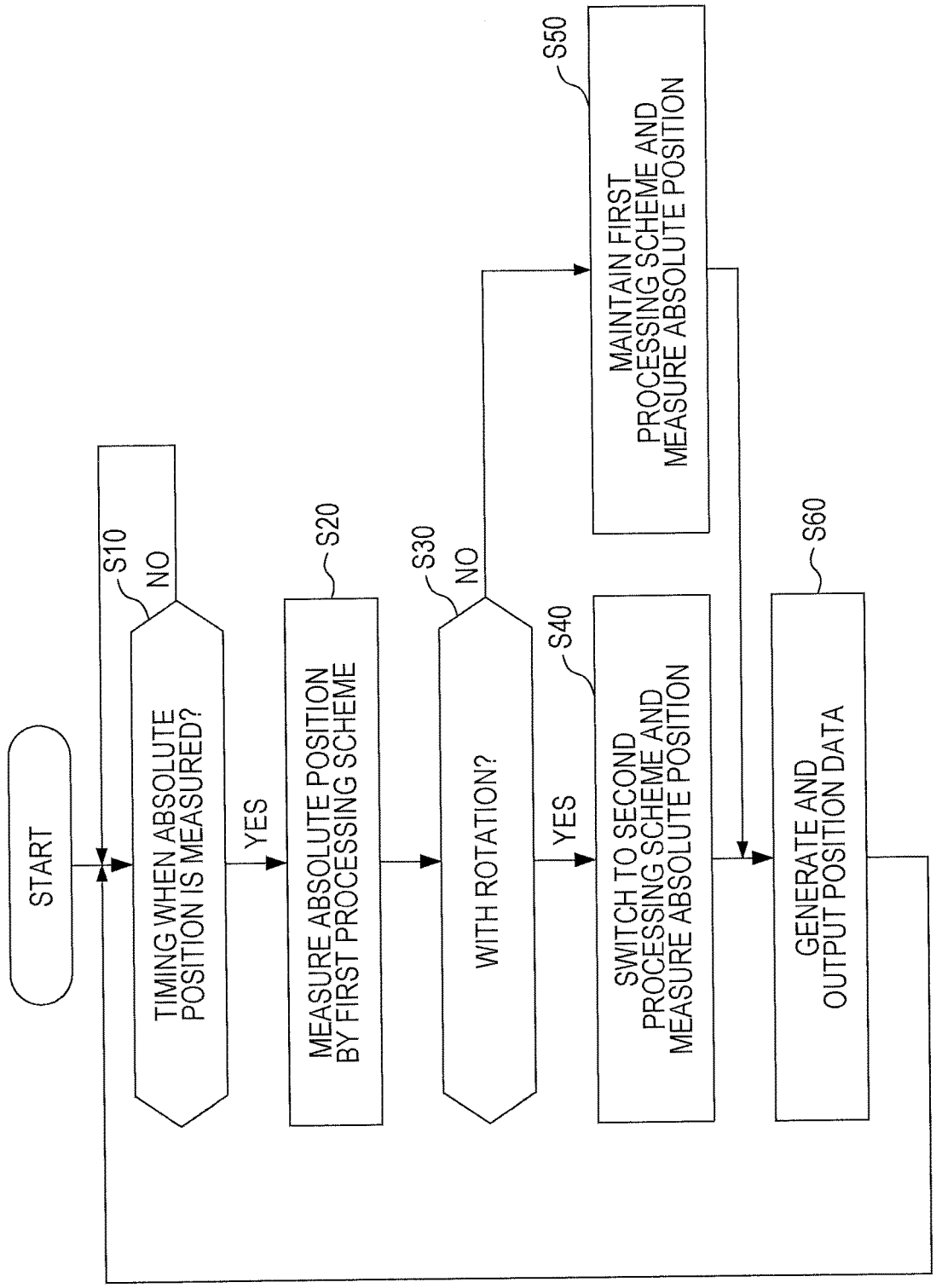
FIG. 14 is a flowchart showing an example of a processing procedure executed by the control unit.

As shown in FIG. 14, in step S10, the control unit 130 determines whether or not it is the timing of measuring the absolute position. As described above, the timing of measuring the absolute position is, for example, a time when the encoder 100 is turned on or a time of the subsequent check processing.

In step S20, the control unit 130 allows the processing scheme switcher 132 to set the processing scheme of the absolute position specifying section 140 to the first processing scheme 140A, and measures the absolute position.

In step S30, the control unit 130 allows the rotation detection section 131 to determine whether or not the absolute position measured in step S20 has changed, in other words, whether or not the disk 110 has rotated. When the absolute position has changed (step S30: YES), the process proceeds to step S40, and the control unit 130 allows the processing scheme switcher 132 to switch the processing scheme of the absolute position specifying section 140 to the second processing scheme 140B, and measures the absolute position. On the other hand, when the absolute position does not change (step S30: NO), the process proceeds to step S50, and the control unit 130 maintains the processing scheme of the absolute position specifying section 140 in the first processing scheme 140A and measures the absolute position.

In step S60, the control unit 130 superimposes the first position data specified by the first position specifying section 133 and the second position data specified by the second position specifying section 134 on the signal Q representing the absolute position generated by the absolute position specifying section 140 in step S40 or S50 by the position data generator 135 or the like, to generate the position data representing the highly accurate absolute position, and thus to output the generated position data to the control device CT. With the above, the flow ends.

3. Effects of the Present Embodiment

As described above, the encoder 100 of this embodiment includes the disk 110 on which the absolute pattern (slit tracks SA1 and SA2) is formed and the control unit 130 that generates the signal Q representing the absolute position based on the absolute pattern. The control unit 130 includes the rotation detection section 131 that detects the presence or absence of rotation of the disk 110 and the processing scheme switcher 132 that switches the processing scheme for generating the signal Q representing the absolute position, based on the presence or absence of the rotation. Thereby, the following effect can be achieved.

That is, in general, an encoder that detects an absolute position is premised on measuring the absolute position in a state where a disk is stopped at a detection timing such as when a power is turned on. However, for example, when a power failure occurs during driving of the motor, the motor may enter a free-run state, and power may be restored in the free-run state. In such a case, the absolute position is detected while the disk is rotating. As described above, depending on the encoder, in order to check the position data calculated while the motor is being driven, the check processing for measuring the absolute position periodically at a predetermined timing may be performed. In such a case, the conventional encoder may not be able to detect the absolute position with high accuracy because the disk is rotating, and further improvement in detection accuracy has been demanded.

In the encoder 100 of this embodiment, when the absolute position is measured, the presence or absence of rotation of the disk 110 is detected, and the processing scheme for generating the signal Q representing the absolute position in the absolute position specifying section 140 of the control unit 130 is switched according to the presence or absence of rotation. As a result, the signal Q representing the absolute position can be generated by a processing scheme according to the presence or absence of rotation of the disk 110 at the time of measurement, so that not only when the motor M is stopped but also when the motor M is rotating, the absolute position can be detected with high accuracy.

In this embodiment, in particular, the rotation detection section 131 detects the presence or absence of rotation based on whether or not the signal Q representing the absolute position generated by the first processing scheme 140A has changed. The processing scheme switcher 132 maintains the first processing scheme 140A when the signal Q representing the absolute position does not change, and switches the first processing scheme 140A to the second processing scheme 140B when the signal Q representing the absolute position has changed.

As described above, in the encoder 100 of this embodiment, since the rotation of the disk 110 is detected based on a change in the signal Q representing the absolute position, there is no need to provide new component or circuit for the rotation detection, and existing components and circuits may be used.

In this embodiment, in particular, the control unit 130 includes the first reference pulse generator 143 that generates the first reference pulse CP1 based on the incremental pattern (slit track SI1) formed on the disk 110, the second reference pulse generator 148 that generates the second reference pulse CP2 having a phase difference of 90° in terms of electric angle from the first reference pulse CP1 based on the incremental pattern (slit track SI1), the first code signal generator 141 that generates the first code signal A based on the absolute pattern (slit tracks SA1 and SA2), the second code signal generator 142 that generates a second code signal B having a phase difference of 180° in terms of electric angle of the first reference pulse CP1 and the second reference pulse CP2 from the first code signal A based on the absolute pattern (slit tracks SA1 and SA2), and the signal converting section 145 that converts the first code signal A or the second code signal B into the signal Q representing the absolute position. In the first processing scheme 140A, the signal converting section 145 converts one of the first code signal A and the second code signal B, which is selected based on the first reference pulse CP1 by the signal selecting section 144, into the signal Q representing the absolute position. In the second processing scheme 140B, the signal converting section 145 converts the signal Y obtained by latching previously specified one of the first code signal A and the second code signal B with the second reference pulse CP2 into the signal Q representing the absolute position. Thereby, the following effect can be achieved.

That is, in the encoder 100 of this embodiment, the first code signal A and the second code signal B obtained based on the absolute pattern are out of phase by 180° with each other, and the signal selecting section 144 selects one of the signals based on the first reference pulse CP1. As a result, the absolute position can be specified using the code signal that is not in a unstable region such as a transition point of the code signal, and the detection accuracy can be improved. In the first processing scheme 140A, that is, when the disk 110 is stopped, the first code signal generator 141 or the second code signal generator 142 may generate the first code signal A or the second code signal B at a position corresponding to the change point of the absolute pattern, so that the detection accuracy can be improved by executing the selection of the code signal described above. On the other hand, when the processing scheme is switched to the second processing scheme, that is, when the disk 110 is rotating, as described above, the first code signal A can be latched near the center (stable region) of the switching timing. Thus, the code signal is not selected, and the absolute position is specified using a previously specified one of the signals, so that processing by the signal selecting section 144 or the like becomes unnecessary, thereby simplifying signal processing.

In this embodiment, in particular, the first code signal generator 141, the second code signal generator 142, the first reference pulse generator 143, and the second reference pulse generator 148 are mounted on a common integrated circuit. Thereby, the following effect can be achieved.

For example, when the first code signal generator 141, the second code signal generator 142, the first reference pulse generator 143 and the second reference pulse generator 148 are mounted on different integrated circuits, there may be a case where the timings of latching the absolute signal and the incremental signal are not simultaneous due to a difference in processing time. In this case, there is no problem as long as the disk 110 is stopped. However, when the disk 110 is rotating, an amount of phase fluctuation between the generated code signal and the reference pulse increases as the rotational speed increases, and this may decrease the detection accuracy for the absolute position.

In the encoder 100 of this embodiment, when the first code signal generator 141, the second code signal generator 142, the first reference pulse generator 143 and the second reference pulse generator 148 are mounted on a common integrated circuit, the absolute signal and the incremental signal can be latched substantially simultaneously. As a result, even when the disk 110 is rotating and the rotational speed is high, the amount of phase fluctuation between the generated code signal and the reference pulse can be reduced, and the detection accuracy for the absolute position can be increased. In particular, since the absolute position can be detected with high accuracy even during high-speed rotation of the motor M, there is an advantage that the check processing can be executed even during high-speed rotation.

4. Modification

The disclosed embodiment is not limited to that described above, but may be modified in various forms so long as it does not deviate from the scope and the technical concept. Hereinafter, such modifications will be described.

4-1. Case Where Presence or Absence of Rotation is Detected Based on Presence or Absence of Latch of Signal In the above embodiment, the processing scheme of the absolute position specifying section 140 is first set to the first processing scheme 140A, and the presence or absence of rotation of the disk 110 is detected based on the change in the signal Q representing the absolute position. However, the presence or absence of rotation may be detected by other methods. For example, the processing scheme of the absolute position specifying section 140 may be first set to the second processing scheme 140B, and the presence or absence of rotation of the disk 110 may be detected based on whether or not the first code signal A is latched. The present modification will be described with reference to FIGS. 15 and 16.

Figure 15:
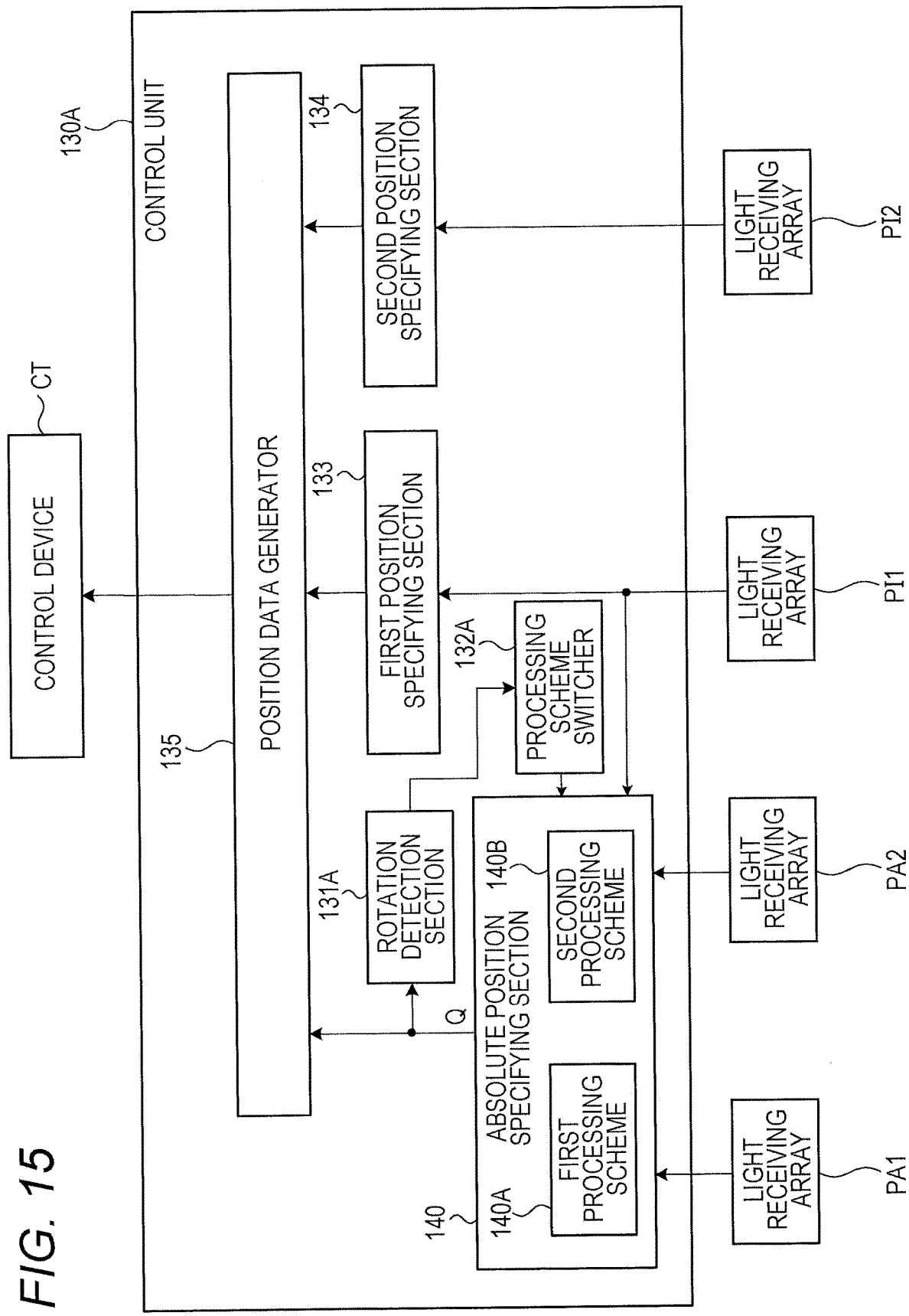
FIG. 15 is a block diagram showing an example of a functional configuration of a control unit in a modification in which presence or absence of rotation is detected based on presence or absence of latch of the signal.

FIG. 15 shows an example of a functional configuration of a control unit 130A of this modification. As shown in FIG. 15, the control unit 130A includes a rotation detection section 131A and a processing scheme switcher 132A instead of the rotation detection section 131 and the processing scheme switcher 132 described above. Other functional configurations are the same as those of the above-described control unit 130 shown in FIG. 6, description thereof will be omitted.

The rotation detection section 131A detects the presence or absence of rotation of the disk 110. Specifically, in the absolute position specifying section 140 set to the second processing scheme 140B, whether or not the first code signal A has been latched by the signal latch section 147 is detected. When the first code signal A is not latched, it is determined that when there is no rotation of the disk 110, and when the first code signal A has been latched, it is determined that there is rotation of the disk 110. Presence or absence of latch of the first code signal A is detected based on, for example, a change in the signal Q representing the absolute position. For example, in the second processing scheme 140B, when the first code signal A is not latched, the signal Q representing the absolute position is prevented from being output, and it may be detected that the first code signal A has been latched when the signal Q representing the absolute position starts to be output. When the first code signal A is not latched, a predetermined signal is output as the signal Q representing the absolute position, and it may be detected that the first code signal A has been latched when the signal Q representing the absolute position is changed from the predetermined signal.

The processing scheme switcher 132A sets the processing scheme of the absolute position specifying section 140 to the second processing scheme 140B as an initial setting. Then, when the first code signal A is not latched by the signal latch section 147 of the second processing scheme 140B (when the signal Q representing the absolute position does not change. When there is no rotation of the disk 110), the processing scheme of the absolute position specifying section 140 is switched from the second processing scheme 140B to the first processing scheme 140A. On the other hand, when the first code signal A has been latched (when the signal Q representing the absolute position has changed. When there is rotation of the disk 110), the second processing scheme 140B is maintained.

Figure 16:
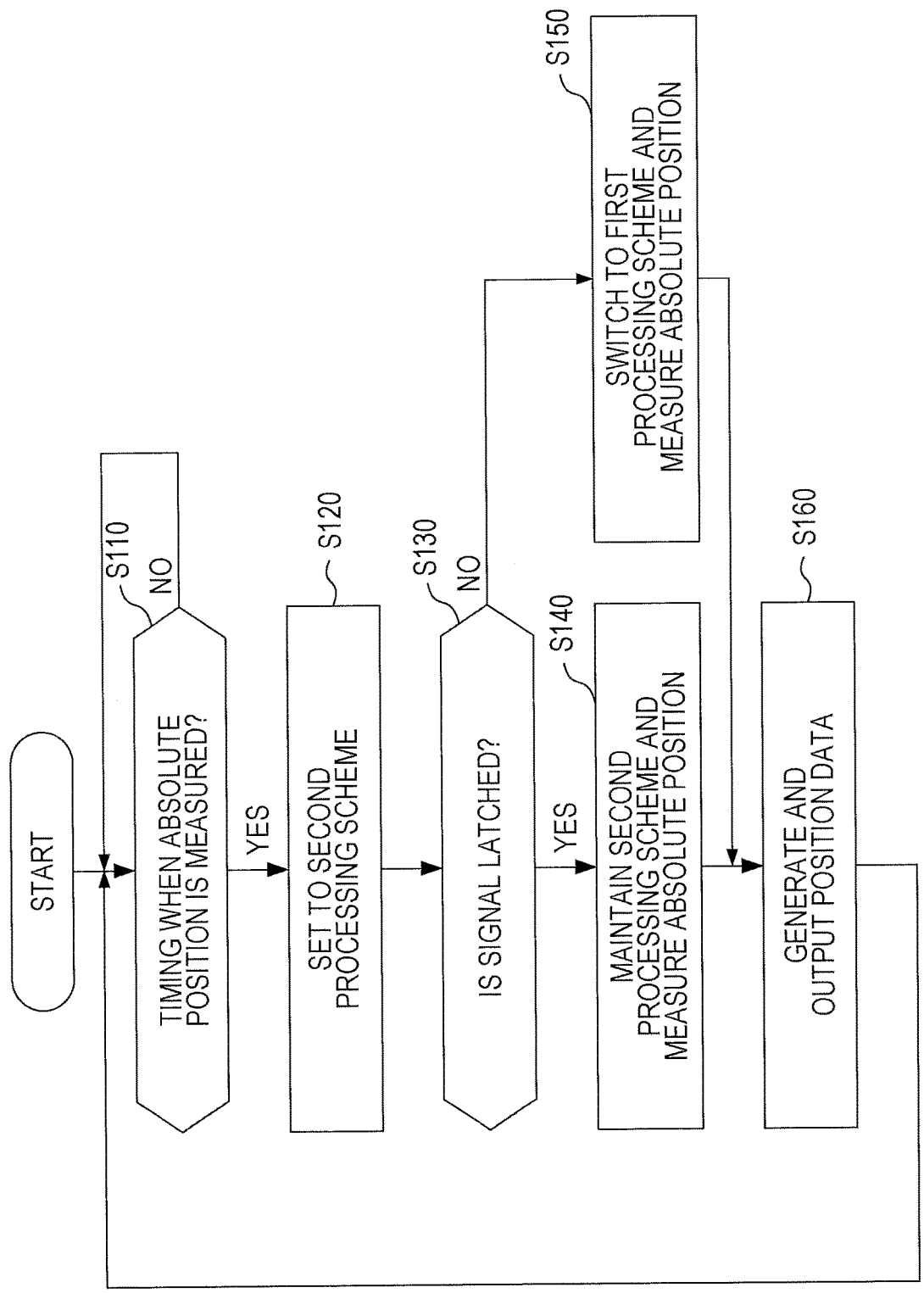
FIG. 16 is a flowchart showing an example of a processing procedure executed by the control unit in the modification in which the presence or absence of rotation is detected based on the presence or absence of latch of the signal.

FIG. 16 shows an example of a processing procedure executed by the control unit 130A. As shown in FIG. 16, in step S110, the control unit 130A determines whether or not it is the timing of measuring the absolute position. As described above, the timing of measuring the absolute position is, for example, a time when the encoder 100 is turned on or a time of the subsequent check processing.

In step S120, the control unit 130A allows the processing scheme switcher 132 to set the processing scheme of the absolute position specifying section 140 to the second processing scheme 140B.

In step S130, the control unit 130A allows the rotation detection section 131A to determine whether or not the first code signal A has been latched by the signal latch section 147, in other words, whether or not the disk 110 has rotated. When the first code signal A has been latched (step S130: YES), the process proceeds to step S140, and the control unit 130A allows the processing scheme switcher 132A to maintain the processing scheme of the absolute position specifying section 140 in the second processing scheme 140B and measures the absolute position. On the other hand, when the first code signal A is not latched (step S130: NO), the process proceeds to step S150, and the control unit 130A switches the processing scheme of the absolute position specifying section 140 to the first processing scheme 140A and measures the absolute position.

In step S160, the control unit 130A superimposes the first position data specified by the first position specifying section 133 and the second position data specified by the second position specifying section 134 on the signal Q representing the absolute position generated by the absolute position specifying section 140 in step S140 or S150 by the position data generator 135 or the like, to generate the position data representing the highly accurate absolute position, and thus to output the generated position data to the control device CT. With the above, the flow ends.

Also according to the modification described above, an effect similar to that of the above-described embodiment can be obtained.

4-2. Case Where Rotational Speed is Detected Using Incremental Pattern

In the above embodiment, the presence or absence of rotation of the disk 110 is detected based on the change in the signal Q representing the absolute position. However, the rotational speed of the disk 110 may be detected using an incremental pattern. This modification will be described with reference to FIGS. 17 and 18.

Figure 17:
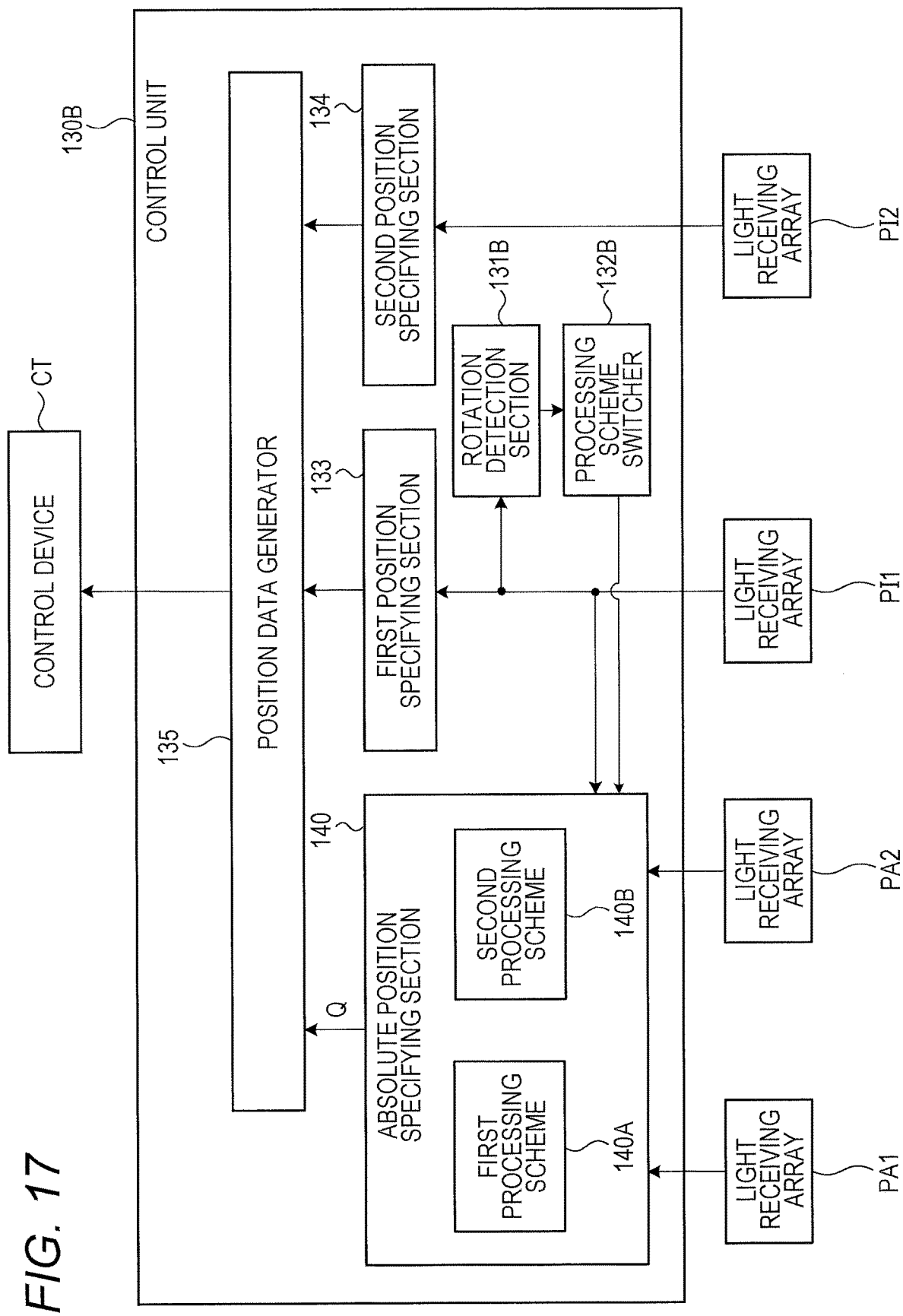
FIG. 17 is a block diagram showing an example of a functional configuration of the control unit in the modification in which the rotational speed is detected using an incremental pattern.

As illustrated in FIG. 17, a control unit 130B according to this modification includes a rotation detection section 131B. The rotation detection section 131B detects the rotational speed (an example of speed) of the disk 110 by, for example, first-order differentiation of the position data based on the incremental pattern formed on the disk 110. For the incremental pattern, only one of the slit tracks SI1 and SI2 or both of them may be used. FIG. 17 illustrates a case where a low incremental signal from the light receiving array PI1 is used as an example.

The processing scheme switcher 132B switches the processing scheme of the absolute position specifying section 140 to the first processing scheme 140A or the second processing scheme 140B based on the rotational speed detected by the rotation detection section 131B. Specifically, the processing scheme switcher 132B switches the processing scheme to the first processing scheme 140A when the rotational speed of the disk 110 is equal to or less than the threshold value, for example. When the rotational speed of the disk 110 is greater than the threshold value, the threshold processing scheme switcher 132B switches the processing scheme to the second processing scheme 140B. The threshold value may be, for example, 0, or may be a predetermined value (the unit is, for example, the rotational speed/min). When the threshold value is 0, the first processing scheme 140A is a processing scheme when the disk 110 is stopped, and the second processing scheme 140B is a processing scheme when the disk 110 rotates. When the threshold value is a predetermined value, the first processing scheme 140A is a processing scheme when the disk 110 rotates at a low speed, and the second processing scheme 140B is a processing scheme when the disk 110 rotates at a high speed.

Since the configuration of the control unit 130B other than the above is the same as that of the above-described control unit 130, description thereof will be omitted.

Next, an example of a processing procedure executed by the control unit 130B will be described with reference to FIG. 18.

Figure 18:
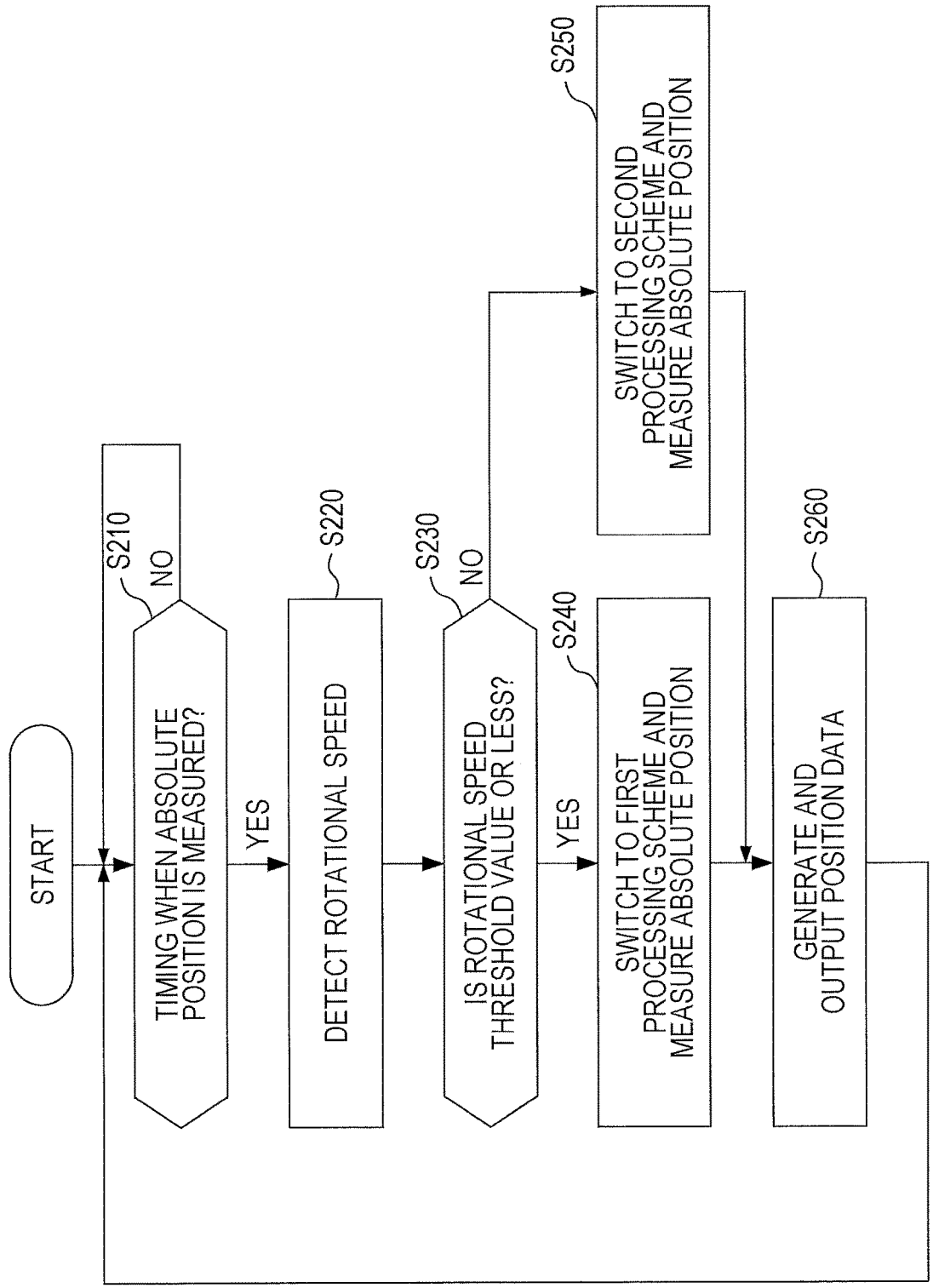
FIG. 18 is a flowchart showing an example of a processing procedure executed by the control unit in the modification in which the rotational speed is detected using the incremental pattern.

As shown in FIG. 18, in step S210, the control unit 130B determines whether or not it is the timing of measuring the absolute position. As described above, the timing of measuring the absolute position is, for example, a time when the encoder 100 is turned on or a time of the subsequent check processing.

In step S220, the control unit 130B allows the rotation detection section 131B to detect the rotational speed of the disk 110.

In step S230, the control unit 130B allows the rotation detection section 131B to determine whether the rotational speed detected in step S220 is equal to or less than a threshold value. When the rotational speed is equal to or less than the threshold value (step S230: YES), the process proceeds to step S240, and the control unit 130B allows the processing scheme switcher 132B to switch the processing scheme of the absolute position specifying section 140 to the first processing scheme 140A and measures the absolute position, and the process proceeds to step S260. On the other hand, if the rotational speed is greater than the threshold value (step S230: NO), the processing scheme of the absolute position specifying section 140 is switched to the second processing scheme 140B, the absolute position is measured, and the process proceeds to step S260.

In step S260, the control unit 130B superimposes the first position data specified by the first position specifying section 133 and the second position data specified by the second position specifying section 134 on the signal Q representing the absolute position generated by the absolute position specifying section 140 in step S240 or S250 by the position data generator 135 or the like, to generate the position data representing the highly accurate absolute position, and thus to output the generated position data to the control device CT. With the above, the flow ends.

As described above, in the encoder 100 of this modification, the rotation detection section 131B detects the rotational speed of the disk 110 based on the incremental pattern (slit tracks SI1 and SI2) formed on the disk 110. The processing scheme switcher 132B switches the processing scheme of the absolute position specifying section 140 to the first processing scheme 140A when the rotational speed is equal to or less than the threshold value, and switches the processing scheme of the absolute position specifying section 140 to the second processing scheme 140B when the rotational speed is greater than the threshold value. Thereby, the following effect is achieved.

In general, in an absolute position encoder, an absolute pattern and an incremental pattern are formed on a disk. When the power is turned on, the absolute position is detected based on the absolute pattern, and then position data is generated using the absolute position and a relative position detected based on the incremental pattern.

In this modification, since the rotation of the disk 110 is detected based on the incremental pattern, there is no need to provide new component or circuit for the rotation detection, and existing components and circuits may be used. Since the processing scheme is switched depending on a magnitude relationship between the detected rotational speed and the threshold value, for example, like a case where the rotational speed is 0 (stop) and a case where the rotational speed is not 0 (during rotation operation), or a case where the rotational speed is equal to or less than a predetermined value (low-speed rotation) and a case where the rotational speed is greater than the predetermined value (high-speed rotation), by appropriately changing the threshold setting, a degree of freedom in designing the timing of switching the processing scheme can be improved.

4-3. Other

In the above embodiment, the process (so-called "stacking process") has been described in which the encoder has two types of incremental patterns with different pitches, and the absolute position with high resolution is specified from the plurality of position data with different resolutions. However, this invention is not limited to this process, and an encoder having only one type of incremental pattern (for example, the slit track SI1) may be employed.

Further, in the above embodiment, the encoder is applied to the rotary type motor in which the rotor rotates with respect to the stator. However, this invention is not limited to this case, and the encoder may be applied to a linear motor in which a movable piece moves with respect to a stator.

If terms "vertical," "parallel," "plane," etc. are used in the above description, these terms are not used in the exact meanings thereof. Specifically, these terms "vertical," "parallel," and "plane" allow tolerances and errors in design and producing and have meanings of "approximately vertical," "approximately parallel," and "approximately plane."

If terms "same," "equal," "different," etc. in relation to a dimension and a size of the appearance, a shape, a position, etc. are used in the above description, these terms are not used in the exact meaning thereof. Specifically, these terms "same," "equal," and "different" allow tolerances and errors in design and producing and have meanings of "approximately the same," "approximately equal," and "approximately different."

However, the term "same", "equal", or "different" concerning a value used as a predetermined determination criterion or representing a predetermined range, such as a threshold value (see the flowchart of FIG. 16) or a reference value is used in a strict sense unlike the above.

Techniques by the embodiment and each modification may be appropriately combined and utilized in addition to the examples having already described above. Although exemplification is not performed one by one, the embodiment and each modification are carried out by various changes being applied thereto without departing from the technical idea of the present disclosure.

5. Hardware Configuration Example of Control Unit

Next, a hardware configuration example of the control unit 130 (the same applies to the control units 130A and 130B) will be described with reference to FIG. 19.

Figure 19:
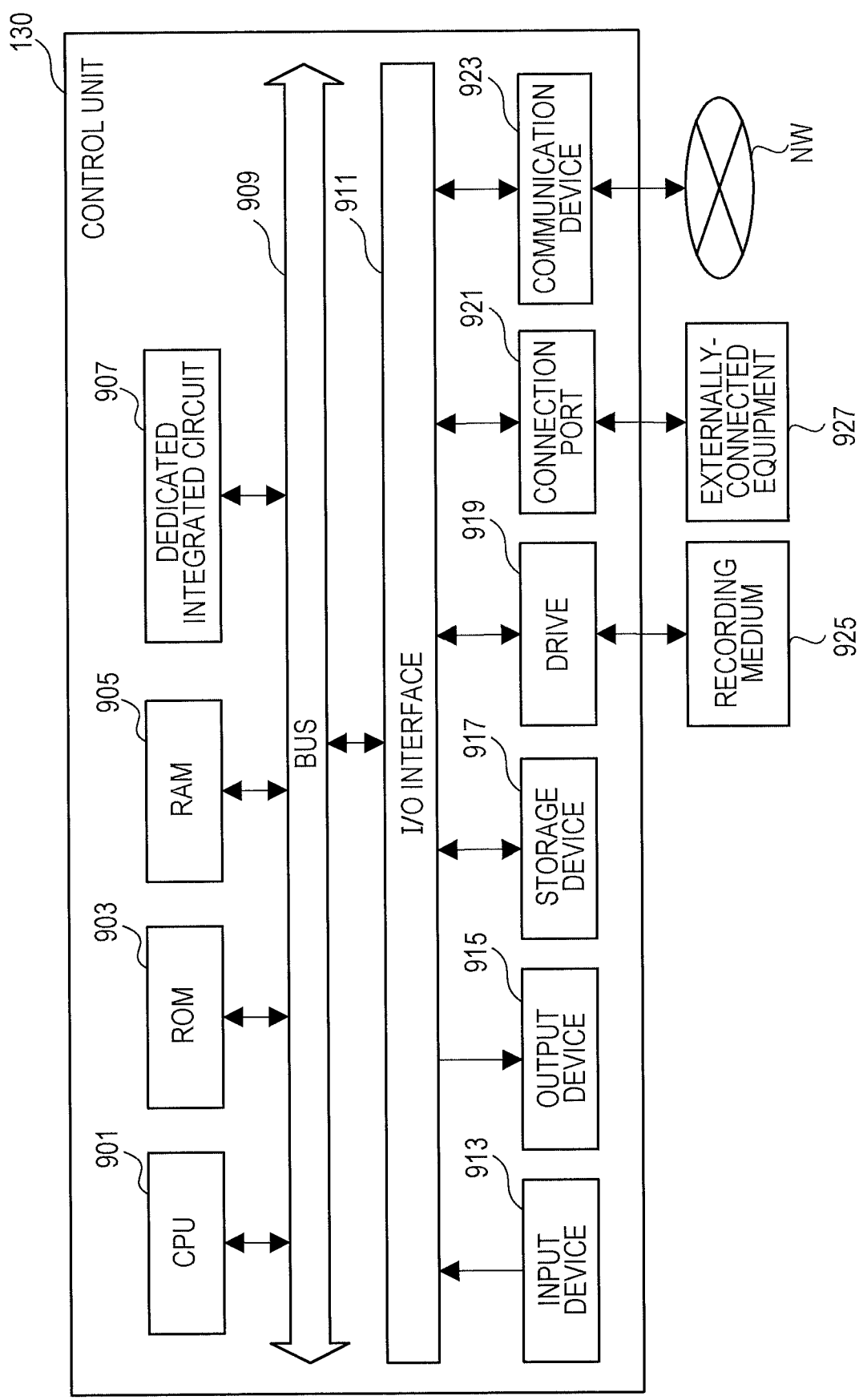
FIG. 19 is a block diagram showing a hardware configuration example of the control unit.

As shown in FIG. 19, the control unit 130 has, for example, a CPU 901, a ROM 903, a RAM 905, a dedicated integrated circuit 907 constructed for specific use such as an ASIC or an FPGA, an input device 913, an output device 915, a storage device 917, a drive 919, a connection port 921, and a communication device 923. These constituent elements are mutually connected via a bus 909 and an I/O interface 911 such that signals can be transferred.

The program can be recorded in the ROM 903, the RAM 905, and the storage device 917, for example.

The program can also temporarily or non-temporarily (permanently) be recorded in a removable recording medium 925 such as magnetic disks including flexible disks, various optical disks including CDs, MO disks, and DVDs, and semiconductor memories. The recording medium 925 as described above can be provided as so-called packaged software. In this case, the program recorded in the removable recording medium 925 may be read by the drive 919 and recorded in the storage device 917 through the I/O interface 911, the bus 909, etc.

The program may be recorded in, for example, a download site, another computer, or another storage device (not shown). In this case, the program is transferred through a network NW such as a LAN and the Internet, and the communication device 923 receives this program. The program received by the communication device 923 may be recorded in the storage device 917 through the I/O interface 911, the bus 909, etc.

The program may be recorded in appropriate externally-connected equipment 927, for example. In this case, the program may be transferred through the appropriate connection port 921 and recorded in the storage device 917 through the I/O interface 911, the bus 909, etc.

Then, the CPU 901 executes various processes according to the program recorded in the storage device 917, so that the absolute position specifying section 140, the rotation detection section 131, the processing scheme switcher 132, the first position specifying section 133, the second position specifying section 134, the position data generator 135, and the like are realized. In this case, the CPU 901 may directly read and execute the program from the storage device 917 or may execute the program once loaded in the RAM 905. In the case where the CPU 901 receives the program through, for example, the communication device 923, the drive 919, or the connection port 921, the CPU 901 may directly execute the received program without recording in the storage device 917.

The CPU 901 may execute various processes based on a signal or information input from the input device 913 such as a mouse, a keyboard, and a microphone (not shown) as needed.

The CPU 901 may output a result of execution of the process from the output device 915 such as a display device and a sound output device, for example, and the CPU 901 may transmit this process result through the communication device 923 or the connection port 921 as needed or may record the process result into the storage device 917 or the recording medium 925.

According to the present embodiment, the absolute position detection accuracy can be increased.

The present invention is not limited to the above-described embodiments. Within the scope of the present invention, the above-described embodiments can be freely combined, as well as any components in the embodiments can be modified or omitted.

What is claimed is:

1. An encoder comprising:
a measurement target including an absolute pattern and being rotatable; and
circuitry configured to
generate, via a processing scheme which includes a first processing scheme and a second processing scheme, a signal representing an absolute position of the measurement target based on the absolute pattern,
detect, based on the absolute pattern, whether the measurement target rotates or not,
change the processing scheme based on whether the measurement target rotates or not,
detect whether the measurement target rotates or not based on whether or not the signal has changed,
maintain the first processing scheme when the signal does not change,
change the processing scheme from the first processing scheme to the second processing scheme when the signal has changed,
generate a first reference pulse based on an incremental pattern provided on the measurement target,
generate, based on the incremental pattern, a second reference pulse having a phase difference of 90° from the first reference pulse in terms of electric angle,
generate a first code signal based on the absolute pattern,
generate, based on the absolute pattern, a second code signal having a phase difference of 180° from the first code signal in terms of electric angle of the first reference pulse and the second reference pulse,
convert the first code signal or the second code signal into the signal representing the absolute position,
convert, in the first processing scheme, a selected signal which is selected from the first code signal and the second code signal based on the first reference pulse into the signal representing the absolute position, and
convert, in the second processing scheme, a latched signal obtained by latching one of the first code signal and the second code signal with the second reference pulse into the signal representing the absolute position.

2. The encoder according to claim 1, wherein the circuitry is provided on a common integrated circuit.

3. A servo motor comprising:
a motor; and
the encoder according to claim 1, the measurement target being connected to the motor to be rotated by the motor.

4. A servo system comprising:
a motor;
the encoder according to claim 1, the measurement target being connected to the motor to be rotated by the motor; and
control circuitry configured to control the motor based on a detection result of the encoder.

5. An encoder comprising:
a measurement target including an absolute pattern and being rotatable; and
circuitry configured to
generate, via a processing scheme which includes a first processing scheme and a second processing scheme, a signal representing an absolute position of the measurement target based on the absolute pattern,
detect, based on the absolute pattern, whether the measurement target rotates or not, change the processing scheme based on whether the
measurement target rotates or not,
detect whether the measurement target rotates or not
based on whether or not a predetermined signal is
latched in the second processing scheme,
maintain the second processing scheme when the predetermined signal is latched,
change the processing scheme from the second processing scheme to the first processing scheme when
the predetermined signal is not latched,
generate a first reference pulse based on an incremental
pattern provided on the measurement target,
generate, based on the incremental pattern, a second
reference pulse having a phase difference of 90°
from the first reference pulse in terms of electric
angle,
generate a first code signal based on the absolute
pattern,
generate, based on the absolute pattern, a second code
signal having a phase difference of 180° from the
first code signal in terms of electric angle of the first
reference pulse and the second reference pulse,
convert the first code signal or the second code signal
into the signal representing the absolute position,
convert, in the first processing scheme, a selected signal
which is selected from the first code signal and the
second code signal based on the first reference pulse
into the signal representing the absolute position, and
convert, in the second processing scheme, a latched
signal obtained by latching one of the first code
signal and the second code signal with the second
reference pulse into the signal representing the absolute position.

6. The encoder according to claim 5, wherein the circuitry is provided on a common integrated circuit.

7. A servo motor comprising:
a motor; and
the encoder according to claim 5, the measurement target being connected to the motor to be rotated by the motor.

8. A servo system comprising:
a motor;
the encoder according to claim 5, the measurement target being connected to the motor to be rotated by the motor; and
control circuitry configured to control the motor based on a detection result of the encoder.

9. An encoder comprising:
a measurement target including an absolute pattern and being rotatable; and
circuitry configured to
generate, via a processing scheme which includes a first processing scheme and a second processing scheme,
a signal representing an absolute position of the measurement target based on the absolute pattern,
detect, based on the absolute pattern, whether the measurement target rotates or not,
change the processing scheme based on whether the measurement target rotates or not,
detect a speed of the measurement target based on an incremental pattern provided on the measurement target,
change the processing scheme to the first processing scheme when the speed is equal to or less than a threshold value,
change the processing scheme to the second processing scheme when the speed is greater than the threshold value,
generate a first reference pulse based on an incremental pattern provided on the measurement target,
generate, based on the incremental pattern, a second reference pulse having a phase difference of 90° from the first reference pulse in terms of electric angle,
generate a first code signal based on the absolute pattern,
generate, based on the absolute pattern, a second code signal having a phase difference of 180° from the first code signal in terms of electric angle of the first reference pulse and the second reference pulse,
convert the first code signal or the second code signal into the signal representing the absolute position,
convert, in the first processing scheme, a selected signal which is selected from the first code signal and the second code signal based on the first reference pulse into the signal representing the absolute position, and
convert, in the second processing scheme, a latched signal obtained by latching one of the first code signal and the second code signal with the second reference pulse into the signal representing the absolute position.

10. The encoder according to claim 9, wherein the circuitry is provided on a common integrated circuit.

11. A servo motor comprising:
a motor; and
the encoder according to claim 9, the measurement target being connected to the motor to be rotated by the motor.

12. A servo system comprising:
a motor;
the encoder according to claim 9, the measurement target being connected to the motor to be rotated by the motor; and
control circuitry configured to control the motor based on a detection result of the encoder.

* * * * *